(12) United States Patent
Kazacos et al.

(10) Patent No.: US 8,541,138 B2
(45) Date of Patent: Sep. 24, 2013

(54) PERFLUORINATED MEMBRANES AND IMPROVED ELECTROLYTES FOR REDOX CELLS AND BATTERIES

(75) Inventors: George Christopher Kazacos, Sylvania Waters (AU); Nicholas Michael Kazacos, Sylvania Waters (AU)

(73) Assignee: Newsouth Innovations PTY Limited (AU)

( * ) Notice: Subject to any disclaimer, the term of this patent is extended or adjusted under 35 U.S.C. 154(b) by 909 days.

(21) Appl. No.: 11/917,989

(22) PCT Filed: Jun. 19, 2006

(86) PCT No.: PCT/AU2006/000856
§ 371 (c)(1),
(2), (4) Date: Jul. 3, 2008

(87) PCT Pub. No.: WO2006/135958
PCT Pub. Date: Dec. 28, 2006

(65) Prior Publication Data
US 2008/0292964 A1    Nov. 27, 2008

(30) Foreign Application Priority Data

Jun. 20, 2005 (AU) .................................. 2005903230
Sep. 12, 2005 (AU) .................................. 2005905012

(51) Int. Cl.
*H01M 4/13* (2010.01)
*H01M 4/58* (2010.01)
*H01M 2/16* (2006.01)

(52) U.S. Cl.
USPC .................... 429/231.5; 429/247; 429/249

(58) Field of Classification Search
None
See application file for complete search history.

(56) References Cited

U.S. PATENT DOCUMENTS

| | | | |
|---|---|---|---|
| 4,298,697 A | 11/1981 | Baczek et al. | |
| 4,469,579 A | 9/1984 | Covitch | |
| 5,417,832 A | 5/1995 | Pellegrino | |
| 6,143,443 A | 11/2000 | Kazacos et al. | |
| 6,465,136 B1 * | 10/2002 | Fenton et al. | 429/309 |
| 6,562,514 B1 * | 5/2003 | Kazacos et al. | 429/204 |
| 6,602,630 B1 | 8/2003 | Gopal | |
| 2003/0091886 A1 * | 5/2003 | Tanioka et al. | 429/33 |
| 2003/0224235 A1 | 12/2003 | Park et al. | |
| 2005/0156431 A1 | 7/2005 | Hennessy | |
| 2005/0156432 A1 | 7/2005 | Hennessy | |
| 2005/0158614 A1 | 7/2005 | Hennessy | |

FOREIGN PATENT DOCUMENTS

| | | |
|---|---|---|
| AU | 575247 | 6/1988 |
| AU | 704534 | 5/1996 |
| WO | WO 95/12219 | 5/1995 |

(Continued)

OTHER PUBLICATIONS

International Search Report and Written Opinion of PCT/AU2006/000856 corresponding to U.S. Appl. No. 11/917,989.

(Continued)

*Primary Examiner* — Cynthia Walls
(74) *Attorney, Agent, or Firm* — Knobbe Martens Olson & Bear, LLP.

(57) ABSTRACT

The present invention describes an improved membrane for Redox Flow Batteries, in particular for Vanadium Redox Batteries and energy storage systems and applications employing the Vanadium Redox Cells and Batteries. Redox Flow Batteries involve the use of two redox couple electrolytes separated by an ion exchange membrane that is the most important cell component.

25 Claims, 7 Drawing Sheets

(56) References Cited

FOREIGN PATENT DOCUMENTS

| WO | WO 03/019714 | 3/2003 |
| WO | WO 03/092138 | 11/2003 |
| WO | WO 2004/082056 | 9/2004 |
| WO | WO 2004082056 A1 * | 9/2004 |

OTHER PUBLICATIONS

K. Sato, S. Miyake and M. Skyllas-Kazacos in Features, Advantages and Applications of the Vanadium Redox Battery, 16$^{th}$ International Forum on Applied Electrochemistry, Amelia Island Plantation, Florida, USA, Nov. 11, 2002.

* cited by examiner

PERFLUORINATED MEMBRANES AND IMPROVED ELECTROLYTES FOR REDOX CELLS AND BATTERIES

RELATED APPLICATIONS

This application is the U.S. National Phase of PCT/AU2006/000856 filed Jun. 19, 2006 and claims priority to Australian Provisional Patent Application Nos. 2005903230 filed Jun. 20, 2005 and 2005905012 filed Sep. 12, 2005, which are hereby incorporated herein by reference in their entirety.

TECHNICAL FIELD

The present invention describes an improved membrane for Redox Flow Batteries, in particular for Vanadium Redox Batteries and energy storage systems and applications employing the Vanadium Redox Cells and Batteries. Redox Flow Batteries involve the use of two redox couple electrolytes separated by an ion exchange membrane that is the most important cell component. A stable, low cost cation exchange membrane is needed for all redox flow cells that operate with an acidic electrolyte and the use of a highly oxidising positive half-cell redox couple in all redox flow cell systems means that the membrane must be stable to oxidising agents. Perfluorinated membranes have been shown to provide excellent stability to oxidising agents, however, the early commercially available membranes have been very expensive and have also shown undesirable properties such as blistering or excessive expansion and water transfer in aqueous acidic electrolytes. The Vanadium Redox Batteries include All-Vanadium Redox Cells and Batteries employing a V(II)/V(III) couple in the negative half-cell and a V(IV)/V(V) couple in the positive half-cell (referred to as the V/VRB, and Vanadium Bromide Redox Cells and Batteries employing the V(II)/V(III) couple in the negative half-cell and a bromide/polyhalide couple in the negative half-cell (referred to as the V/BrRB). The highly oxidising V(V) or polyhalide ions in the charged positive half-cell of the V/VRB and V/BrRB systems respectively, leads to rapid deterioration of most polymeric membrane materials, so only limited types of membranes can be employed for long life. A suitable membrane should therefore possess good chemical stability in the acidic vanadium sulphate or vanadium bromide electrolytes, good resistance to the highly oxidising V(V) or polyhalide ions in the charged positive half-cell electrolyte, low electrical resistance, low permeability to the vanadium ions or polyhalide ions, high permeability to the charge-carrying hydrogen ions, good mechanical properties and low cost.

BACKGROUND

The All-Vanadium Redox Flow Battery, referred to here as the V/VRB is described in the following patents: Australian patent 575247, AU 696452, AU 704534, U.S. Pat. Nos. 6,143,443 and 6,562,514, while the Vanadium Bromide Redox Flow cell, referred to here as the V/BrRB is described in PCT/AU02/01157, PCT/GB2003/001757 and PCT/AU2004/000310. Both batteries employ a vanadium electrolyte solution in both half-cells, but in the case of the V/VRB, a vanadium sulphate solution is used in both half-cells and the cell employs the V(II)/V(III) couple in the negative half-cell and a V(IV)/V(V) couple in the positive half-cell electrolyte. The Vanadium Bromide Redox Battery (V/BrRB) employs a vanadium bromide electrolyte solution in both half-cells and the cell employs the V(II)/V(III) couple in the negative half-cell and a $Br^-/Br_3^-$ or $Br^-/ClBr_2^-$ couple in the positive half-cell electrolyte. The positive half-cell couples are also referred to as halide/polyhalide couples. The highly oxidising V(V) or polyhalide ions in the charged positive half-cell solutions lead to rapid deterioration of most polymeric membrane materials, so only limited types of membranes can be employed for long life. The membrane it can be postulated is therefore the most important component of the Vanadium Redox Batteries (VRBs) and a great amount of effort has been put into the selection or development of a suitable membrane that can offer the following characteristics: good chemical stability in the acidic vanadium sulphate or vanadium bromide electrolytes, good resistance to the highly oxidising V(V) or polyhalide ions in the charged positive half-cell electrolyte, low electrical resistance, low permeability to the vanadium ions or polyhalide ions, high permeability to the charge-carrying hydrogen ions, good mechanical properties and low cost. To date, only limited membranes have been shown to possess all or most of these characteristics. The perfluorinated membranes such as Gore Select, Nafion 112, Nafion 115 and Nafion 117 have been used with some success in the Vanadium Sulphate Electrolyte V/VRB, but these have tended to show blistering or fouling and excessive water transfer behaviour during cycling. The degree of water transfer in the Vanadium Bromide Electrolyte Cell can be so high when these membranes are employed, that after only a small number of cycles, the capacity and coulombic efficiency drops dramatically. The high level of water or solution transfer is caused by the high level of swelling of the extruded Nafion membranes in water and in the acidic vanadium sulphate and vanadium bromide electrolytes that increases the pore size and therefore the transfer of water and vanadium or polyhalide ions across the membrane. The degree of swelling is a function of the ionic strength of the solution, but is most severe in distilled water. When a Nafion membrane is transferred from water to the vanadium electrolyte, considerable shrinkage can occur due to the differences in ionic strength between the pores and the external solution. This means that the Nafion membranes must first be equilibrated in the battery electrolytes prior to stack assembly since any shrinkage after assembly could give rise to ripping of the membrane sheets. Similarly Nafion membranes cannot be assembled dry since the high level of swelling, up to 10%, that occurs when subsequently immersed in the V/VRB and V/BrRB electrolytes, will lead to creasing and possible damage of the membrane in the cell stack. Furthermore, once wet, Nafion membranes should not be allowed to dry out as this could cause cracking of the resin and irreversible damage to the membrane. All of these issues give rise to considerable problems in the handling, storage, assembly and operation of redox flow batteries using Nafion membranes. Nafion membrane are also subject to fouling, so require higher purity electrolytes that significantly adds to the cost of the V-VRB and V/BrRB. These factors, combined with the high electrolyte volume transfer during charge-discharge cycling, has limited the performance of the Nafion membranes in the V/VRB and V/BrRB and combined with the high cost, has restricted its practical use to date. Gore Select membranes have also been tested in the Vanadium Redox Batteries, but significant blistering of the membrane was observed in both the vanadium sulphate and vanadium electrolytes after several weeks of cycling. This showed that the Gore Select perfluorinated membranes are unsuitable for use in the Vanadium Redox Batteries.

Polysulphone membranes have also shown good chemical stability and good performance in the Vanadium Sulphate Electrolyte V/VRB, but have also been susceptible to fouling and loss of performance, requiring very high purity vanadium that adds to the cost of the electrolyte. In particular the presence of trace amounts of silica in the vanadium electrolyte can cause serious fouling, so that costly purification processes are needed to produce vanadium oxides with low silica levels. A further difficulty with this membrane is the need to keep the membrane wet at all times. If allowed to dry out, the membrane can crack and become damaged, but equally serious is the fact that many of the commercial membranes based on polysulphone, become hydrophobic on drying and require a long and sometimes difficult process to restore their hydrophilicity. Despite these problems, polysulphone membranes have been used successfully in the V/VRB, but their performance in the Vanadium Bromide Redox Cell has been very poor. This is due to their anion exchange properties that allow the polyhalide ions to pass through unimpeded, leading to rapid self discharge. To date, therefore, no single membrane has been found to perform well in both the V/VRB and V/BrRB.

It is an object of the present invention to address or ameliorate one or more of the abovementioned disadvantages or at least provide a useful alternative.

Any discussion of documents, publications, acts, devices, substances, articles, materials or the like which is included in the present specification has been done so for the sole purpose so as to provide a contextual basis for the present invention. Any such discussions are not to be understood as admission of subject matter which forms the prior art base, or any part of the common general knowledge of the relevant technical field in relation to the technical field of the present invention to which it extended at the priority date or dates of the present invention.

BRIEF DESCRIPTION OF INVENTION

In embodiments of the present invention, an improved perfluorinated membrane is described that has shown excellent performance in both the V/VRB and the V/BrRB redox flow batteries, thereby allowing the manufacture of a cell stack that can be used with either the Vanadium Sulphate or Vanadium Bromide electrolyte. Due to the different properties and fabrication method used, the behaviour of these membranes in the vanadium redox flow cells is vastly different from those of the corresponding Nafion or Gore Select perfluorinated membranes. Fabrication by dissolved resin solution casting has been found to be particularly advantageous since it results in a membrane with isotropic swelling and tensile strength properties and in particular the high level of swelling is considerably reduced compared to Nafion extruded membranes. The cast membranes show low linear expansion and insignificant swelling when wetted, can be allowed to dry out without any damage and can therefore be assembled in a dry or wet state. To maximise the performance of the cells, the improved perfluorinated membranes are typically pre-treated prior to use, this pre-treatment having the effect of reducing the resistance and therefore increasing the voltage efficiency during charge-discharge cycling. The membrane pre-treatment typically involves soaking the membrane in an aqueous solution for periods in excess of 20 minutes prior to use in the V/VRB or V/BrRB cell. The type of membrane treatment used has been found to be critical to the performance of the membrane in the V-VBR and V/BrRB and the inventors have found a number of excellent methods that give overall energy efficiencies of over 80% in both systems. Significantly, unlike all other membranes previously evaluated in the V/VRB or V/BrRB cells, this improved membrane shows good performance in both electrolytes, so that a redox cell stack for use with either electrolyte interchangeably can be manufactured, allowing significant manufacturing cost savings to be achieved.

In order to minimise any possible bromine vapours from being formed during charging of the V/BrRB, complexing agents may be used to bind the bromine. A range of complexing agents are available for bromine, but any complexing agent used in the V/BrRB must not interfere with the $V^{3+}/V^{2+}$ redox reactions in the negative half-cell, nor cause fouling of the ion-exchange membrane. PCT/AU2004/000310 describes the use of polyethylene glycol (PEG) as a binding agent for bromine in the vanadium bromide redox cell. In the presence of 25% and 50% PEG, during cycling, the cells containing PEG showed no bromine vapours, while that containing no PEG, showed significant amounts of bromine vapour in the electrolyte containers and tubes. PEG is therefore very effective in binding bromine to prevent or minimise the formation of vapours in the cell. Although the coulombic efficiency of the V/Br cell was unaffected by the presence of the PEG, the cells with solutions that contained PEG had much lower average voltage efficiencies in comparison with the solution that did not have any PEG present. It is suspected that the decreased voltage efficiency was due to an increase in resistance in the solutions containing the PEG due to the increased the viscosity of the PEG containing electrolyte solutions. Improved bromine binding or complexing agents are therefore needed for practical V/BrRB cell applications.

Many potential complexing agents were evaluated, and good results were obtained with Tetrabutylammonium bromide (TBA), N-Ethyl-N-Methylpyrrolidiniumbromide (MEP), N-Ethyl-N-Methylmorpholiniumbromide (MEM), or mixtures of these, although the best results were given by mixtures of N-Ethyl-N-Methylpyrrolidiniumbromide (MEP) and N-Ethyl-N-Methylmorpholiniumbromide (MEM).

During operation of the V-VRB and V/BrRB, an imbalance in the state of charge of the positive and negative half-cell electrolytes can occur due to the air oxidation of the V(II) ions in the negative half-cell, or to the generation of hydrogen at the negative electrode during charging. Both of these processes lead to capacity losses that cannot be corrected by simple electrolyte remixing, so a rebalance cell or process is needed to restore balance and therefore system capacity by restoring the correct approximately 1:1 ratio of V(II) to V(V) ions in the negative and positive half-cell solutions respectively of the V/VRB, or approximately 1:1 ratio of V(II) to $Br_3^-$ ions in the negative and positive half-cell solutions respectively of the V/BrRB. The inventors have found that the addition of certain simple organic compounds to the positive electrolyte can rebalance both V-VRB and V/BrRB cells by partially reducing the V(V) or $Br_3^-$ species to equalize the states of charge of the positive and negative half-cell electrolytes. The addition of ethanol or methanol as rebalancing agents is particularly advantageous since the product of the rebalancing reaction is carbon dioxide and water, so no impurities build up in the electrolyte. The amount of ethanol or methanol added can be readily calculated from the positive electrolyte volume and degree of imbalance in the positive and negative half-cell electrolytes.

This invention also relates to Vanadium Redox Battery energy storage systems integrated into an energy system incorporating a photovoltaic array, wind turbines, diesel generators, electricity grid or other power generation equipment. The batteries are integrated with a battery controller that monitors battery condition and determines optimum operation.

In contrast to the V/VRB that employs 1.5-2 molar vanadium electrolytes, the V/BrRB can operate with vanadium bromide concentrations of 2-3 M and bromide concentrations up to 9 M. This corresponds to a specific energy of 25-50 Wh/kg and an energy density range of 35-70 Wh/l for the V/BrRB compared with only 15-25 Wh/kg and 20-33 Wh/l respectively for the V/VRB. With close to twice the energy density, the V/BrRB is much better suited to electric and hybrid vehicle applications. In electric or hybrid vehicles or mobile applications the V/BrRB powers the vehicle and when the available energy is used up, can be either electrically recharged by connecting to a suitable source of DC electric power, including any of the power generation systems described above. Alternatively, the V/BrRB can be mechanically refueled by draining the discharged positive and negative half-cell electrolytes, the catholyte and anolyte respectively, into storage tanks and replacing these with freshly charged solutions. The drained solutions can then be recharged by pumping them through a separate charging V/BrRB stack connected to a power generation system such as any of the systems described above. Alternatively, the solutions can be recharged using off-peak electricity.

Throughout the specification the term redox cell may also be referred to as a redox battery and the All-Vanadium Redox Cells or Batteries and the Vanadium Bromide Redox Cells or Batteries may be collectively referred to as Vanadium Redox Batteries.

Disclosed are improved perfluorinated membranes for use in Redox Flow Cells and in particular, Vanadium Redox Cells and Batteries employing either a vanadium sulphate electrolyte in both half-cells (V/VRB) or a vanadium halide electrolyte in both half-cells (V/BrRB). These membranes differ from traditional extruded perfluorinated membranes in that they have low swelling or linear expansion in both directions and are typically prepared by casting from a solution of dissolved resin. These cast membranes have been developed for use in Proton Exchange Membrane Fuel Cells in which the membrane is used as a solid electrolyte. Surprisingly however, the inventors have discovered that they can be successfully employed in redox flow cells that employ two different solutions containing soluble redox couples wherein the membrane prevents the two solutions from mixing. The inventors have discovered that unlike the traditional extruded perfluorinated membranes, the disclosed resin dissolved cast perfluorinated ion-exchange membranes not only provide good chemical stability in the electrolyte, but also show improved water transfer properties, reduced swelling, reduced fouling and high energy efficiency during cycling. To maximise the performance of the redox cells, the cast perfluorinated membranes are typically pre-treated prior to use, this pre-treatment having the effect of reducing the resistance and therefore increasing the voltage efficiency during charge-discharge cycling in the redox cells.

Disclosed is a Vanadium Redox Battery employing a cast perfluorinated membrane and a 50:50 vanadium(III)/(IV) solution as the initial feed electrolyte solution in both the positive and negative half cells. Disclosed also is a Vanadium Redox Battery employing a cast perfluorinated membrane and a negative half-cell electrolyte solution comprising a supporting electrolyte selected from the group $H_2SO_4$, HBr or HBr/HCl mixtures and containing one or more vanadium ions selected from the group vanadium (IV), vanadium (III), and vanadium (II) and a positive half-cell solution comprising a supporting electrolyte selected from the group $H_2SO_4$, HBr or HBr/HCl mixtures and containing one or more ions selected from the group vanadium (III), vanadium (IV), vanadium (V), $Br_3^-$ and $ClBr_2^-$.

In addition, a method of producing electricity by discharging the fully charged or partially charged Vanadium Redox Cell or Battery is disclosed, as well as methods of recharging the discharged or partially discharged Vanadium Redox Cell or Battery by integrating into a system employing a wind turbine, photovoltaic array, wave generator, diesel generator or other power generating equipment. Methods for rebalancing the vanadium electrolyte solutions and for chemically regenerating the positive half-cell solution of the Vanadium Redox Batteries are also disclosed.

A Vanadium Bromide Redox Cell employing a solution containing a complexing agent for bromine is also disclosed, this complexing agent being selected from Tetrabutylammonium bromide (TBA), N-Ethyl-N-Methylpyrrolidiniumbromide (MEP), N-Ethyl-N-Methylmorpholiniumbromide (MEM), or mixtures thereof. Also disclosed are methods of producing the electrolyte for the V/BrRB.

An immobilised or gelled electrolyte vanadium redox cell employing the resin cast perfluorinated membrane is also disclosed as well as a method of producing electricity by discharging the fully charged or partially charged Vanadium Redox Cell or Battery or the gelled electrolyte cell or battery is disclosed, as well as methods of recharging the discharged or partially discharged gelled electrolyte Vanadium Redox Cell or Battery.

According to a first particular aspect of this invention there is provided a Vanadium Redox Cell or Battery comprising:

a positive half cell containing a positive half cell solution comprising a supporting electrolyte plus one or more ions selected from the group vanadium (III), vanadium (IV), vanadium (V) and polyhalide;

a negative half cell containing a negative half cell solution comprising a supporting electrolyte plus one or more vanadium ions selected from the group vanadium (II), vanadium (III) and vanadium (IV);

a perfluorinated ionically conducting membrane or separator disposed between the positive and negative half cells and in contact with the positive and negative half cell solutions, wherein the perfluorinated membrane has a thickness of between 0.5 and 5 mil, an acid capacity of between 0.5 and 2 mmol/g, a conductivity at 25° C. of between 0.01 and 1 S/cm, a water uptake of between 30% and 70% at 100° C. for 1 hour, a tensile strength of between 20 and 60 MPa and a melting point ranging from 180 to 240° C. The perfluorinated cation exchange membrane comprises a polymer selected from the group a PTFE, perfluorosulfonic acid and perfluorosulphonic acid/PTFE copolymer. Typically, the perfluorinated cation exchange membrane is in the acid form.

The perfluorinated membrane is typically produced by casting from a solution of a resin that has an Equivalent Weight (EW) of between 800 and 1100 grams resin per equivalent SO3-, typically 1032 grams resin per equivalent SO3-, or an ion exchange capacity of between 1.25 and 0.91 milliequivalents SO3- per gram resin, typically 0.97 milliequivlanents SO3- per gram resin. In addition, inorganic micro particles may be added to the membrane to increase the water uptake and conductivity as well as decrease the linear expansion of membrane. The lower EW of this membrane (1032) compared with the corresponding Nafion 11N membrane (EW=1124), results in a higher ion exchange capacity (0.97 meq/g) which is higher than that of Nafion 11N (0.89 meq/g), and this also results in a higher conductivity, water uptake, and power density compared with Nafion. The membrane may be treated prior to use in the Vanadium Redox Battery.

The improved membrane is preferably a resin dissolved cast membrane that shows isotropy, in contrast to the corresponding Nafion-11N that is resin fusing extruding membrane that exhibits anisotropy. The following table summarises the differences between the improved cast perfluorinated membrane and the corresponding Nafion membrane produced by extrusion.

| Perfluorinated PEM | Nafion ®-112 | Cast perfluorinated |
|---|---|---|
| Thickness | 50 microns | 50 microns |
| Equivalent Weight | 1124 g/eq | 1032 g/eq |
| Acid capacity | 0.89 meq/g | 0.97 meq/g |
| Conductivity | 0.08 S/cm | 0.1 S/cm |
| Water uptake | 38% | 50% |
| Linear expansion | 10% (anisotropy) | 1% (isotropy) |
| tensile strength | 32 MPa (anisotropy) | 37 MPa (isotropy) |
| Production | Resin fusing extruding | Dissolved Resin casting |

According to a second aspect of this invention there is provided a Vanadium Redox Cell or Battery which is fully or partially charged comprising:

a positive half cell containing a positive half cell solution comprising a supporting electrolyte and one or more of the ions selected from vanadium (IV) ions, vanadium (V) ions and polyhalide ions;

a negative half cell containing a negative half cell solution comprising a supporting electrolyte, vanadium (III) and vanadium (II) ions;

a perfluorinated ionically conducting membrane or separator of the first aspect disposed between the positive and negative half cells and in contact with the positive and negative half cell solutions.

According to a third aspect of this invention there is provided a discharged vanadium redox cell or battery comprising:

a positive half cell containing a positive half cell solution comprising a supporting electrolyte and vanadium (IV) ions;

a negative half cell containing a negative half cell solution comprising a supporting electrolyte and vanadium (III) ions;

a perfluorinated ionically conducting membrane or separator of the first aspect disposed between the positive and negative half cells and in contact with the positive and negative half cell solutions.

In the first to third aspects, the supporting electrolyte can be selected from the group $H_2SO_4$, HBr, or a mixture of HBr and HCl and the vanadium ion concentration can range from 0.1 to 5 Molar. More typically the vanadium ion concentration is between 1 and 4 M or between 1 and 3 M. The $H_2SO_4$ or HBr concentration is typically between 2 and 9 M, 3 and 8 M, 4 and 6 M or 4 and 8 M and the HBr electrolyte may also contain HCl at a concentration level of between 0.5 and 3 M or 1 and 2 M. In the first to third aspects, the redox cells may be operated over one of the following temperature ranges −15 to 50, 0 to 50, 5 to 50, −10 to 45, 5 to 40, 0 to 40, −10 to 40, 5 to 35, 0 to 35, −10 to 35, 5 to 30, 0 to 30, 5 to 25, 5 to 20, 10 to 50, 15 to 50, 18 to 50, 15 to 40, 15 to 35 degrees centigrade.

In a fourth aspect of this invention, there is provided a Vanadium Bromide Redox Cell comprising a vanadium bromide electrolyte solution in both half-cells, the vanadium bromide solution also including a complexing agent to bind the bromine and prevent any bromine vapours from being produced. Although the complexing agent may be included in both the anolyte and catholyte solutions, it is preferably added only to the catholyte or positive half-cell electrolyte where bromine is generated during charging. Any suitable bromine complexing agent can be used, but preferably, this is Tetrabutylammonium bromide (TBA), N-Ethyl-N-Methylpyrrolidiniumbromide (MEP), N-Ethyl-N-Methylmorpholinium-bromide (MEM), or mixtures of these. Even more preferably, the complexing agent is a mixture of N-Ethyl-N-Methylpyrrolidiniumbromide (MEP) and N-Ethyl-N-Methylmorpholiniumbromide (MEM) in a molar ratio ranging from 0:1.0 to 1.0:0, but preferably ranging from 0.1:1.0 to 1.0 to 0.1. The vanadium ion to total complexing agent ratio ranges from 0.25:1.0 to 1.0:0.25, but preferably from 1:1 to 1.0 to 0.5.

In the first to fourth aspects, the vanadium electrolyte may be immobilised or gelled. A suitable immobilising agent or gelling agent is fumed silica.

In the first to fourth aspects the redox cell may be a stirred or agitated redox cell or a static redox cell or a flow redox cell or other suitable redox cell such as an immobilised redox cell or a gelled redox cell or other redox cell.

In the first to fourth aspects, the vanadium redox cell may be assembled into a bipolar vanadium redox cell stack assembly using bipolar electrodes. The positive and negative electrodes as well as the bipolar may be graphite plate, graphite board, carbon, glassy carbon, carbon felt (eg FMI, Toyoba, Sigri carbon or graphite felts), carbon fibre material (e.g. non-woven, type CFT-3000 Ahlstroem, Finland) cellulose carbon knit (e.g. GF-20, Nikon Carbon Company Limited, Japan), or conducting plastic comprising a carbon filled polyethylene, polypropylene or composite plastic onto which is heat and pressure bonded the carbon felt active layer to provide a high surface area bipolar or end electrode assembly. The bipolar electrode is preferably a carbon filled polyethylene or polypropylene conducting plastic substrate on each side of which is heat and pressure bonded a sheet of carbon felt or graphite felt active layer. The bipolar electrode may be welded to the flow-frame that distributes electrolyte into each half-cell cavity by vibration welding, infrared welding, ultrasonic welding, heat welding or laser welding.

In a fifth aspect of this invention the Vanadium Bromide Redox Battery may also include a phase separation and reconstitution process whereby the organic phase containing the bromine complex is separated by gravity from the aqueous phase in the charged positive half-cell electrolyte of the charging cell, for separate storage and transportation so as to reduce the weight and volume of the stored energy for transportation cost reduction. Before extracting the energy from the charged, concentrated solutions, the organic phase is remixed with the corresponding aqueous phase in the positive half-cell of the discharge cell tanks.

According to a sixth aspect of this invention there is provided a process of rebalancing the electrolytes of a vanadium redox cell comprising fully or partially mixing the positive half cell solution with the negative half cell solution to form a fully mixed solution or partially mixed solution in the positive half cell and the negative half cell.

The positive half cell may be sealed air tight and the positive solution may be deaerated. The positive half cell may be deaerated. The positive half cell and the positive solution may be dearated with nitrogen, argon, helium, or other suitable gas. The positive half cell and the positive solution may be dearated with a non oxygen containing gas. The negative half cell may be sealed air tight and the negative solution may be deaerated. The negative half cell may be deaerated. The negative half cell and the negative solution may be dearated with nitrogen, argon, helium, or other suitable gas. The negative half cell and the negative solution may be dearated with a non oxygen containing gas.

According to an seventh aspect of this invention there is provided a Vanadium Redox Battery system comprising a Vanadium Redox Battery of any one of the first to sixth aspects of the invention and further comprising a positive solution reservoir, positive solution supply and return lines coupled between the positive solution reservoir and the positive half cell, a negative solution reservoir, negative solution supply and return lines coupled between the negative solution reservoir and the negative half cell, and at least one pump in at least one of the positive solution supply and return lines and at least one pump in at least one of the negative solution supply and return lines.

The system of the seventh aspects may further comprise an electrical charger electrically coupled to a positive electrode in the positive half cell and to a negative electrode in the negative half cell. The electrical charger may comprise a power supply and a switch. The system may further comprise an electricity withdrawing circuit electrically coupled to a positive electrode in the positive half cell and to a negative electrode in the negative half cell. The electricity withdrawing circuit may comprise a resistor and a switch.

In an eighth aspect of this invention, a method of rebalancing the positive and negative electrolyte states of charge and system capacity is described. This method involves the addition of a predetermined volume of ethanol, methanol or other organic compound that can be chemically oxidised to carbon dioxide and water by V(V), $Br_2$ or $Br_3^-$ in the positive electrolyte, whereby a proportion of the V(V), $Br_2$ or $Br_3^-$ species is reduced so as to balance the state of charge of the positive and negative half-cell electrolytes.

In a ninth aspect is a method of chemically regenerating the positive half-cell electrolytes of the vanadium redox flow cells using hydrogen peroxide to reduce the electrolyte volume required for each kWh of cell capacity.

In a tenth aspect, a process for producing the vanadium bromide electrolyte for the vanadium bromide redox cell of the first to seventh aspects is described, involving the oxidative dissolution of vanadium trioxide powder using bromine liquid, bromine aqueous solution or bromine vapour as the oxidising agent.

In an eleventh aspect of this invention, a Vanadium Redox Battery of the first to ninth aspects is integrated into an energy or power generation system incorporating a photovoltaic array, a wind turbine, a wave energy generator, a diesel generator or other power generation equipment.

In a further broad form of the invention there is provided a redox cell having a positive half cell, a negative half cell, a positive half cell solution and a negative half cell solution further comprising:

a perfluorinated ionically conducting membrane located between the positive half cell and the negative half cell and in contact with the positive half cell solution and the negative half cell solution wherein the membrane has a thickness selected from the group of consisting of 0.5 to 5 mil, 1 to 2 mil and 25 to 50 micron thickness.

Preferably the membrane has an acid capacity selected from the group consisting of 0.5 to 2 meq/g and 0.9 to 1 meq/g.

Preferably the membrane has a conductivity selected from the group consisting of 0.01 to 1 S/cm and 0.81 to 1 S/cm at 25° C.

Preferably the membrane has a water uptake selected from the group consisting of 30% to 70% and 40 to 60% at 100° C. for 1 hour.

Preferably the membrane has a tensile strength selected from the group consisting of 20 to 60 MPa and 35 to 50 MPa in both directions when water soaked at 23° C.

Preferably the membrane has a linear expansion selected from the group consisting of less than 8%, less than 5% and less than 3% in both directions from 50% Relative Humidity at 23° C. to water soaked at 23° C.

Preferably the membrane has a melting point selected from the group consisting of 180 to 240° C. and 200 to 230° C.

Preferably the membrane is produced by casting from a solution of a resin that has an Equivalent Weight (EW) selected from the group consisting of 800 to 1100 grams resin per equivalent $SO_3^-$ and 1032 grams resin per equivalent $SO_3^-$.

Preferably the membrane is produced by casting from a solution of a resin that has an ion exchange capacity selected from the group consisting of 1.25 to 0.91 milliequivalents $SO_3^-$ per gram resin and 0.97 milliequivlanents $SO_3^-$ per gram resin.

Preferably micro particles are added to the membrane to increase the water uptake and conductivity as well as decrease the linear expansion of the membrane.

Preferably the first supporting electrolyte and the second supporting electrolyte are substantially identical.

Preferably the membrane has isotropic swelling and tensile strength properties.

In yet a further broad form of the invention there is provided a redox cell having a positive half cell, a negative half cell, a positive half cell solution and a negative half cell solution further comprising:

a perfluorinated cationically conducting membrane located between the positive half cell and the negative half cell and in contact with the positive half cell solution and the negative half cell solution wherein the membrane has isotropic swelling and tensile strength properties.

Preferably said cell has a perflourinated cationically conducting membrane wherein the membrane has a thickness selected from the group of consisting of 0.5 to 5 mil, 1 to 2 mil and 25 to 50 micron thickness.

Preferably the membrane has an acid capacity selected from the group consisting of 0.5 to 2 meq/g and 0.9 to 1 meq/g.

Preferably the membrane has a conductivity selected from the group consisting of 0.01 to 1 S/cm and 0.81 to 1 S/cm at 25° C.

Preferably the membrane has a water uptake selected from the group consisting of 30% to 70% and 40 to 60% at 100° C. for 1 hour.

Preferably the membrane has a tensile strength selected from the group consisting of 20 to 60 MPa and 35 to 50 MPa in both directions when water soaked at 23° C.

Preferably the membrane has a linear expansion selected from the group consisting of less than 8%, less than 5% and less than 3% in both directions from 50% Relative Humidity at 23° C. to water soaked at 23° C.

Preferably the membrane has a melting point selected from the group consisting of 180 to 240° C. and 200 to 230° C.

Preferably the membrane is produced in use by casting from a solution of a resin that has an Equivalent Weight (EW) selected from the group consisting of 800 to 1100 grams resin per equivalent $SO_3^-$ and 1032 grams resin per equivalent $SO_3^-$.

Preferably the membrane is produced by casting from a solution of a resin that has an ion exchange capacity (1/EW) selected from the group consisting of 1.25 to 0.91 milliequivalents $SO_3^-$ per gram resin and 0.97 milliequivlanents $SO_3^-$ per gram resin.

Preferably micro particles are added to the membrane to decrease the linear expansion of the membrane.

In yet a further broad form of the invention there is provided a redox cell having a positive half cell, a negative half cell, a positive half cell solution and a negative half cell solution further comprising:

a perfluorinated ionically conducting membrane located between the positive half cell and the negative half cell and in contact with the positive half cell solution and the negative half cell solution wherein the membrane has a thickness of between 0.5 to 5 mil; an acid capacity of between 0.5 and 2 meq/g; a conductivity at 25° C. of between 0.01 and 1 S/cm; a water uptake of between 30% and 70% at 100° C. for 1 hour; a tensile strength of between 20 and 60 MPa in both directions when water soaked at 23° C.; a linear expansion of less than 8% from 50% Relative Humidity at 23° C. to water soaked at 23° C. in both directions; a melting point ranging from 180 to 240° C., wherein the perfluorinated membrane is produced by casting from a solution of a resin selected from a group consisting of a resin that has an Equivalent Weight (EW) of between 800 and 1100 grams resin per equivalent $SO_3^-$ and a resin having an ion exchange capacity of between 1.25 and 0.91 milliequivalents $SO_3^-$ per gram resin.

Preferably said cell has a perflourinated ionically conducting membrane wherein the membrane has a thickness selected from the group of consisting of approximately 1 to 2 mil and approximately 25 to 50 micron thickness.

Preferably the membrane has an acid capacity of 0.9 to 1 meq/g.

Preferably the membrane has a conductivity of 0.81 to 1 S/cm at 25° C.

Preferably the membrane has a water uptake of 40 to 60% at 100° C. for 1 hour.

Preferably the membrane has a tensile strength of 35 to 50 MPa in both directions when water soaked at 23° C.

Preferably the membrane has a linear expansion selected from the group consisting of less than 5% and less than 3% in both directions from 50% Relative Humidity at 23° C. to water soaked at 23° C.

Preferably the membrane has a melting point of 200 to 230° C.

Preferably the membrane is produced by casting from a solution of a resin that has an Equivalent Weight (EW) of 1032 grams resin per equivalent SO3-.

Preferably the membrane is produced by casting from a solution of a resin that has an ion exchange capacity of 0.97 milliequivlanents SO3- per gram resin.

Preferably micro particles are added to the membrane to decrease the linear expansion of the membrane.

Preferably the positive half cell solution includes a first supporting electrolyte selected from the group consisting of $H_2SO_4$, HBr and HBr/HCl mixtures and at least one vanadium ion selected from the group consisting of vanadium (III), vanadium (IV) and vanadium (V); and wherein the negative half cell solution includes a second supporting electrolyte selected from the group consisting of $H_2SO_4$, HBr and HBr/HCl mixtures and at least one vanadium ion selected from the group consisting of vanadium (II), vanadium (III) and vanadium (IV).

Preferably the positive half cell solution includes at least one vanadium ion selected from the group consisting of vanadium (III), vanadium (IV) and vanadium (V); and the negative half cell solution includes at least one vanadium ion selected from the group consisting of vanadium (II), vanadium (III) and vanadium (IV).

In a further broad form of the invention there is provided a method for treating the perfluorinated membranes of the redox cell described above comprising the step of soaking the membrane in an aqueous solution to reduce resistivity of the membrane and enhance voltage efficiency during charge-discharge cycling.

Preferably the treatment is carried out at above room temperature.

Preferably the membrane treatment is conducted in a process having at least one step and in at least one aqueous solution.

Preferably the aqueous solution is selected from the group consisting of hydrogen peroxide, HCl, NaOH and sulphuric acid.

Preferably said method further comprises boiling the membrane in water.

BRIEF DESCRIPTION OF DRAWINGS

FIG. 5(a) shows results obtained at the beginning of cycling and FIG. 5(b) shows results after a few weeks of cycling wherein decreased performance is seen.

FIGS. 16 (a) and (b) show the effect of addition of hydrogen peroxide to chemically regenerate the positive half-cell electrolyte of a vanadium redox cell.

DETAILED DESCRIPTION OF PREFERRED EMBODIMENTS

Figure 1:
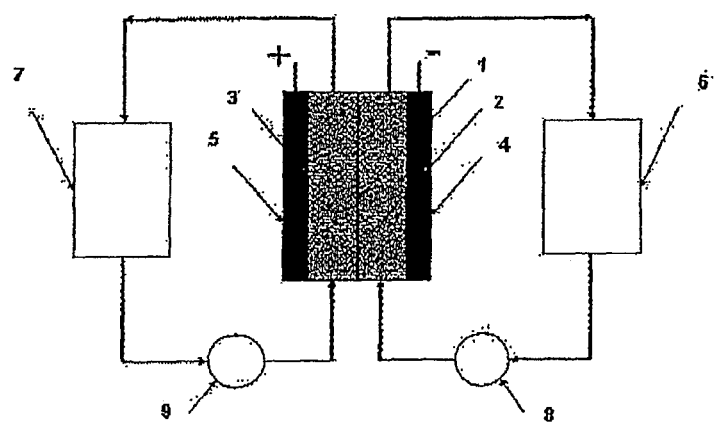
FIG. 1 illustrates a vanadium redox flow cell employing a perfluorinated cation exchange membrane (1) to separate the positive and negative half-cells. Each half-cell includes a porous graphite felt or matte as the negative (2) or positive (3) flow-through electrode, each making electrical contact with a conducting substrate or current collector (4 and 5). The negative and positive electrolyte half-cell solutions are stored in separate external reservoirs (6 and 7) and pumps 8 and 9 are used to pump the electrolytes through the corresponding half-cells where the charge-discharge reactions occur.
Figure 2:
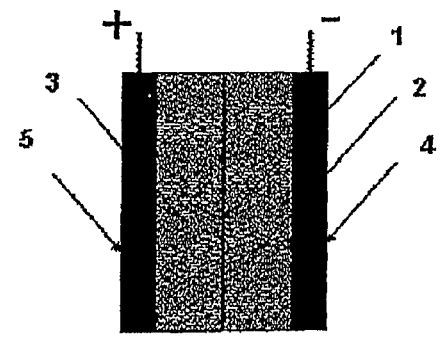
FIG. 2 illustrates a static or gelled electrolyte redox cell employing a perfluorinated membrane (1) to separate the positive and negative half-cells. In the gelled electrolyte redox cell, each half-cell contains a graphite felt porous electrode impregnated with the V(3.5+) vanadium electrolyte that also contains sufficient fumed silica such that a gel is formed in both the negative (2) and positive (3) half-cell graphite felt electrodes when allowed to set. The graphite felt electrodes make electrical contact to a conducting substrate that is used as current collector in both the negative (4) and positive (5) half-cells.

Throughout the specification and claims the term Vanadium Redox Battery is used to refer collectively to the All-Vanadium Redox Cell or Battery and the Vanadium Bromide Redox Cell or Battery. The supporting electrolytes used in the Vanadium Redox Batteries of the invention are preferably aqueous solutions selected from the group $H_2SO_4$, HBr or HBr/HCl mixtures. The Vanadium Redox Batteries can employ an initial feed solution of 0.1 to 5 M vanadium (III)/(IV) ions in both half-cells. The concentration of vanadium ions in both half-cells may be in the range 0.1 to 4.5M, 0.1 to 4M, 0.1 to 3.5M, 0.1 to 3M, 0.1 to 2.5M, 0.1 to 2M, 0.1 to 1.9M, 0.1 to 1.75M, 0.1 to 1.5M, 0.1 to 1.25M, 0.1 to 1M, 0.5 to 5M, 0.5 to 4 M, 0.5 to 3 M, 1 to 2 M, 1 to 3 M, 1 to 5M, 1.5 to 5M, 1.75 to 5M, 1.9 to 5M, 2 to 5M, 2.25 to 5M, 2.5 to 5M, 2.75 to 5M, 3 to 5M, 3.5 to 5M, 4 to 5M, 4.5 to 5M, 1.75 to 4.5M, 1.75 to 4M, 1.75 to 3.5M, 1.75 to 3.25M, 1 to 2, 1 to 3M, 1.5 to 3M, 1.75 to 3M, 1 to 2.75M, 1.5 to 2.75M 1.75 to 2.75, 1.5 to 2.5M, 1.75 to 2.5M, 1.75 to 2.25M, 1.75 to 2M, 1.9 to 3M, 1.9 to 2.75, 1.9 to 2.5M, 1.9 to 2.25M or 2 to 3M. The concentration of vanadium in both half-cells may be about 0.1, 0.25, 0.5, 0.75, 1, 1.25, 1.5, 1.6, 1.75, 1.8, 1.9, 2, 2.1, 2.2, 2.3, 2.4, 2.5, 2.6, 2.7, 2.8, 2.9, 3, 3.25, 3.5, 3.75, 4, 4.25, 4.5, 4.75 or 5M, for example. An initial feed solution of 0.5 to 3 M vanadium solution consisting of approximately 50% V(III) and 50% V(IV) ions in a supporting electrolyte of $H_2SO_4$, HBr or HBr/HCl mixtures may be initially placed into the positive and negative half-cells. The initial feed solution for the V/VRB is typically 0.5 to 3 M V(III)/V(IV) ions in 2-8 M $H_2SO_4$, but more typically 1-2 M V(III)/V(IV) ions in 4-6 M or 4-5 M $H_2SO_4$. The Vanadium Sulphate electrolyte solution may also contain stabilising agents to prevent the thermal precipitation of V(V) ions at elevated temperatures.

The electrolyte solution that is initially placed in both half-cells of the Vanadium Bromide Redox Bell may comprise 0.5 to 3 M V(III)/(IV) ions in a supporting electrolyte of 1 to 9 M HBr, for example, or 2 to 9 M HBr or 3 to 8 M HBr or 4 to 6 M HBr. The vanadium bromide electrolyte may also contain HCl at a concentration between 0.5 and 3 M or 0.5 to 2 M or 1 to 2 M or 0.1 to 3 M. The vanadium bromide electrolyte may also contain a complexing agent for bromine, this complexing agent being selected from Tetrabutylammonium bromide (TBA), N-Ethyl-N-Methylpyrrolidiniumbromide (MEP), N-Ethyl-N-Methylmorpholiniumbromide (MEM), or mixtures of these, preferably, N-Ethyl-N-Methylpyrrolidiniumbromide (MEP), N-Ethyl-N-Methylmorpholiniumbromide (MEM), or mixtures thereof. Even more preferably, the complexing agent is a mixture of N-Ethyl-N-Methylpyrrolidiniumbromide (MEP) and N-Ethyl-N-Methylmorpholiniumbromide (MEM) in a molar ratio ranging from 0:1.0 to 1.0:0, more preferably in a molar ration ranging from 0.25:0.75 to 0.75:0.25. The vanadium ion to total complexing agent molar ratio ranges from 10:1 to 1:1, but is preferably in the range 8:1 to 1:1 or 6:1 to 1:1 or 3:1 to 1:1.

In a separate embodiment, the initial feed solution for the positive half-cell is 0.5 to 3 M V(IV) ions in a supporting electrolyte selected from the group 2-6 M $H_2SO_4$, 2-6 M total sulphate or 1 to 9 M HBr, while the initial feed solution for the negative half-cell comprises 0.5 to 3 M V(III) ions in a supporting electrolyte selected from the group 2-6 M $H_2SO_4$, 2-6 M total sulphate or 1 to 9 M HBr. The total vanadium ion concentration is 0.5 to 5 M or 0.5 to 4 M or 1 to 4 M or 1.5 to 4 M or 1.5 to 3 or 1.5 to 2 or 2 to 4 M or 2 to 3 M and the $H_2SO_4$, total sulphate or HBr concentration may be 2-9 M, 2-8 M, 2-7 M, 2-6 M, 2-5 M, 3-9 M, 3-8 M, 3-7 M, 3-6 M, 4-9 M, 4-8 M, 4-7 M, 4-6 M, 5-9 M, 5-8 M, 5-7 M, 5-6 M, 6-9 M, 6-8 M. The HBr electrolyte may also contain 0.5 to 3 M HCl, more typically 1-2 M HCl. The HBr electrolyte may also contain a complexing agent to bind the bromine, the total concentration of N-Ethyl-N-Methylpyrrolidiniumbromide (MEP) and N-Ethyl-N-Methylmorpholiniumbromide (MEM) ranging from 0.1 to 3 M, but more typically is 0.25 to 2 M or 0.25 to 1.5 M while the MEM to MEP ratio can range from between 0:1 to 1:0. Preferably, the MEM to MEP ratio is between 0.25:0.75 and 0.75:0.25, while the vanadium to total MEM/MEP molar ratio is in the range 10:1 to 1:1, or in the range 5:1 to 1:1, and more preferably in the range 4:1 to 2:1.

In a separate embodiment of this invention, a gelled or immobilised vanadium redox cell is also disclosed. By immobilising or gelling the vanadium cell electrolytes with an immobilising or gelling agent such as silica, fumed silica, fumed alumina, fumed titania or polyacrylamide, it is also possible to stabilise a higher concentration of vanadium in the electrolyte. The immobilisation or gelling of the electrolyte also binds any bromine vapour produced in the positive half-cell during charging, preventing any bromine escaping from the cell. The electrolyte may also contain a complexing agent to bind the bromine and reduce any bromine vapour.

The two half-cell electrolytes of the flow-cell are separated by a perfluorinated ion exchange membrane which prevents the bulk mixing of the 2 solutions as they are pumped through the cell or cell stack. The ion exchange membrane is a perfluorinated cation exchange membrane which allows the transfer of the charge carrying $H^+$ ions. The perfluorinated membrane has a thickness of between 0.5 and 5 mil, preferably between approximately 1 and 2 mil or between approximately 25 and 50 micron thickness, an acid capacity of between 0.5 and 2 meq/g, preferably between 0.9 and 1 meq/g, a conductivity at 25° C. of between 0.01 and 1 S/cm, preferably between 0.81 and 1 S/cm, a water uptake of between 30% and 70%, preferably between 40 and 60% at 100° C. for 1 hour, a tensile strength of between 20 and 60 MPa, preferably between 35 and 50 MPa in both directions when water soaked at 23° C., a linear expansion of less than 8% from 50% Relative Humidity at 23° C. to water soaked at 23° C., preferably less than 5% and more preferably less than 3% in both directions and a melting point ranging from 180 to 240° C., preferably between 200 and 230° C. The perfluorinated membrane is typically produced by casting from a solution of a resin that has an Equivalent Weight (EW) of between 800 and 1100 grams resin per equivalent $SO_3^-$, typically 1032 grams resin per equivalent $SO_3^-$, or an ion exchange capacity (1/EW) of between 1.25 and 0.91 milliequivalents $SO_3^-$ per gram resin, typically 0.97 milliequivlanents $SO_3^-$ per gram resin. In addition, micro particles may be added to the membrane to increase the water uptake and conductivity as well as decrease the linear expansion of membrane. The lower EW of this membrane (1032) compared with the corresponding Nafion 11N membrane (EW=1124), results in a higher ion exchange capacity (0.97 meq/g) which is higher than that of Nafion 11N (0.89 meq/g), and this also results in a higher conductivity, water uptake, and power density compared with Nafion. The cast membrane may be treated prior to use in the vanadium sulphate redox flow cell. The perfluorinated cation exchange membrane comprises a polymer selected from the group a PTFE, perfluorosulfonic acid and perfluorosulphonic acid/PTFE copolymer. Typically, the perfluorinated cation exchange membrane is a cast perfluorinated membrane in the acid form.

Typically the perfluorinated membrane is treated by soaking in an aqueous solution for between 5 minutes and 24 hours. To speed up the treatment process, the membranes may be soaked in the aqueous solution at temperatures above room temperature. The membrane treatment can be a single step or a multi-step process involving the step-wise soaking the membrane in one or more of the treatment solutions at or above room temperature. The treatment solutions can include boiling or near boiling water, or solutions of $H_2SO_4$, $H_2O_2$, HCl or NaOH. The treatments in $H_2SO_4$, $H_2O_2$, HCl or NaOH can be at room temperature or at elevated temperature, but typically, the lower the treatment temperature, the longer the necessary treatment time and vice versa. Typically the thicker membranes require treatment at higher temperature and/or for longer periods than the thinner membranes. Suitable treatments for membranes of less than 50 microns thickness include soaking at or near room temperature in solutions of $H_2SO_4$, $H_2O_2$, HCl or NaOH for periods over 5 hours, preferably for more than 10 hours and even more preferably for more than 20 hours. Membranes of thickness equal to or greater than 50 microns are typically treated in solutions of $H_2SO_4$, $H_2O_2$, HCl or NaOH at above room temperature, more typically at above 50° C., for periods of between 5 and 90 minutes, or preferably for between 10 and 60 minutes or more preferably for between 20 and 60 minutes.

The negative and positive electrode materials for the vanadium redox flow cell or redox cell may be porous carbon or graphite felt, matte or cloth materials on a graphite, glassy carbon or conducting plastic substrate. The positive electrode material can also be an oxide coated titanium metal sheet or expanded metal mesh. Multiple cells can also be incorporated into a cell stack consisting of bipolar electrodes, these bipolar electrodes comprising carbon or graphite felt, cloth or matte either pressed against or heat welded onto a conducting plastic substrate, this conducting plastic substrate comprising carbon filled polyethylene, polypropylene or other thermoplastic polymer that may also be mixed with a rubber material to impart good mechanical properties. The bipolar electrodes for the vanadium redox flow cell or redox cell can also be produced by heat bonding the porous carbon or graphite felt into each side of a polyethylene, polypropylene or other polymer sheet such that the conducting carbon or graphite felt fibres in each side of the insulating substrate contact each other through the plastic sheet, thereby making electrical contact without the need to add a conducting filler to the plastic substrate. The bipolar electrodes may be welded to the electrolyte flow-frame by infrared welding, vibration welding, ultrasonic welding, heat welding or laser welding.

The two half-cell electrolytes are stored in external tanks and are pumped through the cell stack where the charging and discharging reactions occur. The electrolytes can be electrically charged by connecting the cell or battery terminals to a suitable power source, but can also be mechanically refueled by exchanging the discharged solutions with recharged solutions at a refueling station in the case of electric vehicle applications. The charging and discharging of the electrolytes can be performed by two separate stacks, one for charging and one for discharging and the electrolytes can be transported between the charging stacks and the discharging stacks either by road, train or ship. To reduce the cost of transportation, the organic MEM-bromine, MEP-bromine and/or MEM-MEP-bromine complex can be separated from the aqueous component of the electrolyte by simple gravity separation and transported to the discharge stack site where it is added to an equivalent aqueous solution and mixed together to produce an emulsion that is pumped through the discharging stacks to release the stored energy. The required proportion of the discharged solution is then transported to the charging station where the MEM-bromine, MEP-bromine or MEM-MEP-bromine active species is again produced in the positive half-cell electrolyte during the charging phase and again separated by gravity from the aqueous component of the positive electrolyte prior to transportation to the discharge station. In parallel, water can be removed from the charged negative half-cell electrolyte prior to transportation and reconstituted prior to use.

To discharge the battery, the stack terminals are connected to a load and when the circuit is closed, electricity is produced by the flow of electrons from the negative terminal to the positive terminal of the cell or battery stack. Charging and discharging can be carried out either with the pumps switched on and the electrolytes recirculating through the external tanks and cell stack, or with the pumps off, allowing the solution in the stack itself to undergo discharge reactions. Periodically the two solutions may be remixed to produce the original V(3.5+) electrolyte in both tanks. This mixing allows any chemistry imbalance arising from the transfer of ions across the membrane to be corrected, so that the capacity of the system can be restored. The periodic mixing can be full or only partial mixing and also allows for any electrolyte level imbalance in each half-cell reservoir to be equalized. The electrolyte level equalization can be done by using pumps or by simply gravity rebalance. Periodically predetermined volumes of methanol or ethanol are added to the positive electrolyte to restore the balance in the state of charge of the positive and negative half-cell electrolytes.

In a separate embodiment, the 2-4 M vanadium electrolyte may be gelled with 3-6 wt % fumed silica or other suitable gelling agent to produce a gelled or immobilised electrolyte Vanadium Redox Battery that permits greater stabilisation of the vanadium ions in the electrolyte and minimises electrolyte or in the case of the V/BrRB, bromine vapour leakage from the cell or cell stacks. In this embodiment, all of the solutions are stored in the cell stack and there are no external tanks or pumps.

This invention also relates to Vanadium Redox Battery energy storage system and associated automated control systems to enhance performance. The vanadium bromide redox battery energy storage system (VBRES) of this invention includes reservoirs to store the vanadium electrolyte, an energy conversion mechanism defined as a cell stack, a piping and pumping flow system, and a power conversion system (PCS). A suitable energy storage system for remote or on-grid power system applications that are supplied by either photovoltaic arrays, wind turbine generators or wave generators would employ a V/BrRB redox battery of the present invention. The anolyte and catholyte solutions are pumped from the anolyte and catholyte tanks into the negative and positive half-cells of the cell stack via the anolyte and catholyte supply lines. The anolyte and catholyte supply lines each communicate with a variable speed pump and optionally a heat exchanger that transfers generated heat from the anolyte or catholyte solutions to a fluid or gas medium. The anolyte and catholyte supply lines include one or more supply line valves to control the volumetric flow of the solutions. The negative and positive electrodes are in electrical communication with a power source and a load. A power conversion system may be incorporated to convert DC power to AC power as needed. A control system may be embodied as a programmable logic computer with a processor in electrical communication with a memory that receives and stores executable applications and data. As load increases, the control system turns the pumps on or increases pump speeds to maintain supply of charged electrolyte species to the cells. As load decreases, the pump speeds are decreased or can be switched off for a preset time to allow the electrolyte in the cell stacks to provide the reactants for the discharge reactions. The pumps are automatically switched on once the stack or cell voltage reaches a predetermined lower limit during discharge, or as soon as the load exceeds a pre-set value. Temperature limits are typically set at a minimum of 5° C. and at a maximum of 40° C. If the temperature exceeds these limits, partial electrolyte mixing can be used as an emergency discharge method to bring the State of Charge (SOC) of the anolyte and catholyte down to a safe level for the corresponding temperature. The same system integration and operation can also be used with the V-VRB.

If an imbalance between the negative and positive half-cell SOCs is created in either the V-VRB or V/BrRB, this can be rebalanced by exchanging charged solution with discharged solution, or by chemically reducing the positive half-cell electrolyte SOC with a chemical reductant such as ethanol or methanol.

During operation of either the V-VRB or V/BrRB of this invention, the control module also monitors the levels of the anolyte and catholyte solutions and determines if equalization of solution reservoir levels is needed. The control module operates the equalization/mix control valve between the anolyte and catholyte tanks to adjust the reservoirs levels as needed.

MODE OF OPERATION

A 1-3 M vanadium solution comprising approximately 50% V(III) and 50% V(IV) ions in an electrolyte of either 3-6 M total sulphate or in a solution containing 4-9 M HBr plus 0.5-2 M HCl, is added in approximately equal volumes to both sides of the Vanadium Redox Cell or Battery. The cells or battery stacks comprise carbon or graphite felt electrodes heat and pressure bonded onto both sides of plastic or conducting plastic sheets as substrate materials and the two half cells are separated by a cast perfluorinated or modified resin extruded cation exchange membrane. The conducting plastic substrates are typically carbon-filled polyethylene or carbon-filled polypropylene. The carbon-filled composite may also include rubber to improve its mechanical properties. The bipolar electrodes may be attached to the electrolyte flow-frame by vibration welding, ultrasonic welding, heat welding or laser welding. The electrodes of the vanadium redox cell may also be made using carbon or graphite felt or matte compressed against a glassy carbon or graphite sheet substrate. The perfluorinated membrane has an approximate thickness of between 1 and 5 mil, preferably between 1 and 2 mil or between 25 and 50 microns, an acid capacity of between 0.5 and 2 mmol/g, a conductivity at 25° C. of between 0.01 and 1 S/cm, a water uptake of between 30% and 70% at 100° C. for 1 hour, a tensile strength of between 20 and 60 MPa and a melting point ranging from 180 to 240° C. The perfluorinated membrane is produced by casting from a solution of a resin that has an Equivalent Weight (EW) of between 800 and 1100 grams resin per equivalent $SO_3$, or approximately 1032 grams resin per equivalent $SO_3^-$ or an ion exchange capacity (1/EW) of between 1.25 and 0.91 milliequivalents $SO_3^-$ per gram resin, typically 0.97 milliequivlanents $SO_3^-$ per gram resin. In addition, micro particles may be added to the membrane to increase the water uptake and conductivity as well as decrease the linear expansion of membrane. The lower EW of this membrane (1032) compared with the corresponding Nafion 11N membrane (EW=1124), results in a higher ion exchange capacity (0.97 meq/g) which is higher than that of Nafion 11N (0.89 meq/g), and this also results in a higher conductivity, water uptake, and power density compared with Nafion. The cast membrane may be treated prior to use in the vanadium redox flow cell. The perfluorinated cation exchange membrane comprises a polymer selected from the group a PTFE, perfluorosulfonic acid and perfluorosulphonic acid/PTFE copolymer. Typically, the perfluorinated cation exchange membrane is in the acid form.

To reduce its resistivity, the perfluorinated membrane is treated by soaking the membrane in an aqueous solution to enhance the voltage efficiency during charge-discharge cycling. Typically the treatment of the thicker membranes is carried out at above room temperature in a single or multi-step process in one or more aqueous solutions for a time ranging from 1 minute to 5 hours. The membrane can also be treated by soaking in an aqueous solution for 5 hours or more at or near room temperature.

The two half-cell electrolytes are stored in external tanks and are pumped through the cell stack where the charging and discharging reactions occur. The electrolytes can be electrically charged by connecting the cell or battery terminals to a suitable power source selected from grid power, a wind generator, a photovoltaic array, diesel generator or wave generator, but can also be mechanically refueled by exchanging the discharged solutions with recharged solutions at a refueling station.

The vanadium redox battery system includes an All Vanadium Redox Battery or a Vanadium Bromide Redox Battery which has a positive half cell containing a positive half cell solution and positive electrode, a negative half cell containing negative half cell solution and negative electrode and a cast perfluorinated ionically conducting separator which separates the positive half cell from the negative half cell and is in contact with the positive solution and the negative solution. A positive solution reservoir is coupled to the positive half cell by a positive solution supply line and return line. The positive solution return line incorporates a pump. The negative solution reservoir comprises a negative solution supply line and return line coupled between the negative solution reservoir and the negative half cell. The negative solution return line has a pump. A power supply is electrically coupled to the positive electrode in the positive half cell and to the negative electrode in the negative half cell. An electricity withdrawing circuit or load is electrically coupled to the positive electrode in the positive half cell and to negative electrode in the negative half cell. The half cells and solution reservoirs are sealed air tight and the positive and negative electrolyte solutions may be deaerated. The atmosphere above the solutions in the half cells and reservoirs may be an inert gas such as nitrogen, helium or argon, or mixtures thereof, for example.

Typically, the positive and negative half cell solutions comprise vanadium (III) and vanadium (IV) ions in a V(III):V(IV) molar ratio of about 1:1 and the volumes of the negative half cell solution and the volume of the positive half cell solution are approximately equal. During the first charging step, sufficient electricity from the power supply is allowed to flow between the electrodes and the positive half cell solution is recirculated through the positive half cell and the negative half cell solution is recirculated through the negative half cell such that predominantly vanadium (IV) ions are formed in the positive half cell solution and predominantly V(III) ions is formed in the negative half cell solution where the cell is at a zero state of charge or near zero state of charge. The charging is allowed to continue in a second charging step so that the redox cell is fully or partially charged comprising vanadium (II) in the negative half cell solution. In the Vanadium Bromide Redox Cell or Battery, the fully or partially charged positive half-cell electrolyte includes $Br_2$, $Br_3^-$ or $ClBr_2^-$ ions. Once the second charging step is completed (or partially completed) the redox battery may be used to deliver electricity by via the electricity withdrawing circuit. Once the redox cell is fully or partially discharged to a zero state of charge or near zero state of charge, the cell may be recharged by repeating the second charging step as described above.

In an alternative way of operating the system, a predominantly vanadium (IV) solution in $H_2SO_4$, HBr, or HBr/HCl mixed electrolyte may be initially placed in the positive half cell and reservoir and a predominantly V(III) solution in $H_2SO_4$, HBr or HBr/HCl mixed electrolyte may be placed in the negative half cell and reservoir in equal volumes such that the cell is at a zero state of charge or near zero state of charge. The cell may then be charged in accordance with the second charging step described above and discharged as described above.

More typically the Vanadium Redox Battery system incorporates several cells assembled into a monopolar or bipolar cell stack employing end electrodes and monopolar or bipolar electrodes separated by the cast perfluorinated membrane. The positive half-cell electrolyte is pumped through each positive half-cell, connected hydraulically in series or parallel, while the negative half-cell electrolyte is pumped through each negative half-cell, connected hydraulically in series or parallel. Preferably, the stack uses bipolar electrodes and parallel hydraulic connection of the electrolyte flow lines. The number of series connected bipolar cells can range from 2 to 200 in a single stack, although more typically, 5 to 50 cells are connected in a bipolar arrangements to produce one stack sub-module and several sub-stack modules are connected in series and or parallel to provide the current and voltage needed in the energy storage application.

The electrolytes can be electrically charged by connecting the cell or battery terminals to a suitable power source selected from grid power, a wind generator, a photovoltaic array, diesel generator or wave generator, but can also be mechanically refueled by exchanging the discharged solutions with recharged solutions at a refueling station. The charging and discharging of the electrolytes can be performed by two separate stacks, one for charging and one for discharging and the electrolytes can be transported between the charging stacks and the discharging stacks either by road, train or ship. To facilitate and reduce the cost of transportation, the organic MEM-bromine, MEP-bromine and/or MEM-MEP-bromine complex can be separated from the aqueous component of the electrolyte by simple gravity separation and transported to the discharge stack site where it is added to an equivalent aqueous solution and mixed together to produce an emulsion that is pumped through the discharging stacks to release the stored energy. The required proportion of the discharged solution is then transported to the charging station where the MEM-bromine, MEP-bromine or MEM-MEP-bromine active species is again produced in the positive half-cell electrolyte during the charging phase and again separated by gravity from the aqueous component of the positive electrolyte prior to transportation to the discharge station. Simultaneously, water can be removed from the charged negative half-cell electrolyte prior to transportation and is reconstituted prior to use.

EXAMPLES

Example 1

Figure 3:
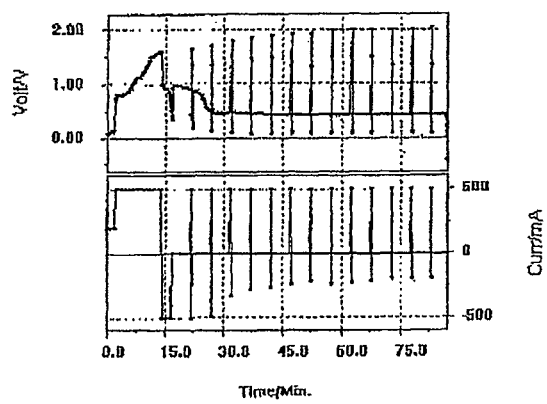
FIG. 3 shows the voltage versus time curves obtained in a static vanadium bromide redox cell employing a polysulphone anion exchange membrane and 2 M vanadium ions in a supporting electrolyte of 6 M HBr plus 2 M HCl.

A piece of polysulphone anion exchange membrane was placed into a static vanadium bromide redox cell. FIG. 3 shows the voltage versus time curves obtained at a current of 500 mA and electrode area of 25 $cm^2$. No discharge curves could be obtained Example 2

Figure 4:
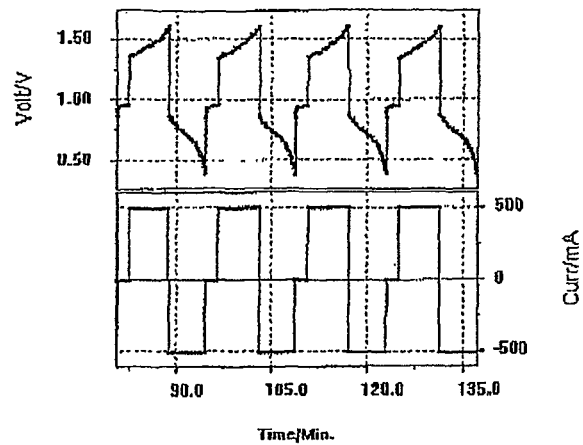
FIG. 4 shows typical charge-discharge curves obtained in a static vanadium bromide redox cell employing 2 M vanadium ions in a supporting electrolyte of 6 M HBr plus 2 M HCl. The membrane was a 25 $cm^2$ piece of Nafion 112 and the cell was cycled at 500 mA.

A piece of Nafion 112 membrane was placed into a Vanadium Bromide static cell comprising 2 M Vanadium in 6 M HBr plus 2 M HCl electrolyte and graphite felt electrodes of area 25 $cm^2$. The cell was cycled at a current of 500 mA and typical charge-discharge curves are presented in FIG. 4. The Nafion initially showed a high voltage resistance and the following results were obtained:
Voltage Efficiency—47%
Columbic Efficiency—91%

After only a few hours of cycling however, the cell capacity dropped dramatically and further cycling could not be obtained.

When the Nafion 112 membrane was placed in a flow cell containing 70 ml of the same electrolyte in each half-cell, the positive electrolyte began to cross over to the negative half-cell during the initial charge cycle and continued to transfer from the positive half-cell with further cycling, requiring regular manual transfer of solution back to the positive to maintain the electrolyte levels in the two solution reservoirs.

Figure 5:
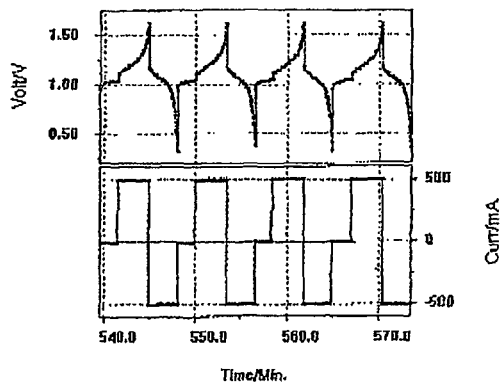
FIGS. 5(a) and 5(b) show typical charge-discharge curves obtained in a vanadium bromide flow cell employing a 25 $cm^2$ piece of Gore Select membrane and 70 ml of 2 M Vanadium in a supporting electrolyte of 6 M HBr plus 2 M HCl.
Figure 5:
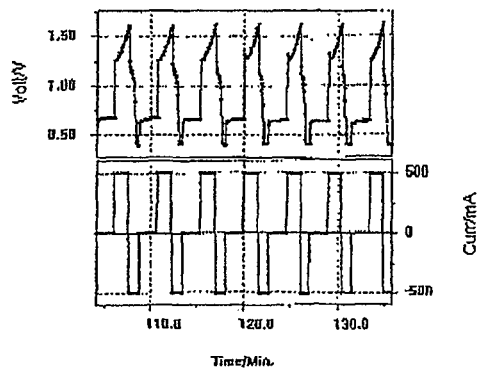

The flow cell was dismantled and the Nafion 112 membrane was replaced with a piece of Gore Select cation exchange membrane and cycling was continued at 1 Amp. Typical charge-discharge curves are shown in FIG. 5. At the beginning of cycling, this membrane showed very good results with Voltage Efficiency—84% and Columbic Efficiency—92% as illustrated in FIG. 5(a). After a few weeks of cycling, however, the performance decreased (FIG. 5(b)) and when the cell was dismantled, the membrane was found to have blistered, showing that it is unstable in the acidic vanadium bromide electrolyte. The same behaviour was observed when this membrane was cycled in a V-VRB with a 2 M vanadium sulphate electrolyte.

Example 3

A perfluorinated cation exchange membrane prepared by casting from a solution of a resin with EW (Equivalent Weight)=1032 g resin/eq $SO_3^-$, so the ion exchange capacity=1/EW=0.97 meq $SO_3^-$/g resin, was tested in a V/Br static cell. The 50 micron thick cast perfluorinated membrane had the following properties:

Nominal Thickness: 2 mil or 50 microns
Acid Capacity: 0.97 mmol/g
Conductivity: 0.1 S/cm (25° C.)
Water Uptake: 50% (100° C., 1 h)
Linear Expansion: 1% (23° C., from 50% RH to water soaked)
Tensile Strength: 37 MPa (50% RH, 23° C., Isotropy)
Melting Point: 219° C.

Figure 6:
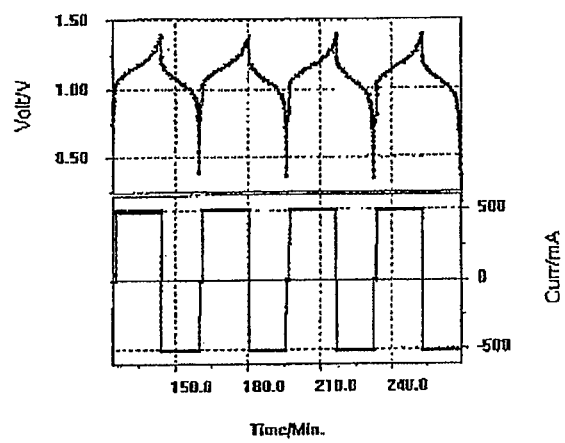
FIG. 6 shows typical charge-discharge curves obtained in a static vanadium bromide redox cell employing 2 M vanadium ions in a supporting electrolyte of 6 M HBr plus 2 M HCl. The membrane was a piece of 50 micron cast perfluorinated membrane.

The membrane was soaked in sulphuric acid at 50° C. for 1 hour and then placed in a static V/Br cell for cycling. The Vanadium Bromide (V/Br) static cell comprised 2 M Vanadium in 6 M HBr plus 1.5 M HCl electrolyte and graphite felt electrodes of area 25 cm². The cell was cycled at a current of 500 mA. This showed good, stable results with the following efficiencies as illustrated in FIG. 6: Voltage Efficiency—90%; Coulombic Efficiency—90%. The cell was cycled for several days with no drop in capacity or efficiency.

Several additional treatments were tested with the 50 micron, 25 micron and 125 micron cast perfluorinated membranes and the results are summarized in the following Table:

| Membrane Thickness (microns) | Treatment | Coulombic Eff. % | Voltage Eff. % |
|---|---|---|---|
| 125 | 1 hour @ 80° C. in 5% $H_2O_2$, rinse, then 1 hour @ 80° C. in 10% $HNO_3$ | No result due to high membrane resistance | N/A |
| 125 | Boiled in 5 M $H_2SO_4$ for 1 hour | 90% | 60% |
| 50 | 1 hour @ 80° C. in 5% $H_2O_2$, rinse, then 1 hour @ 80° C. in 10% $HNO_3$ | 50% | 57% |
| 50 | Manufacturer's recommended Treatment: 1 hour @ 80° C. in 5% $H_2O_2$, 1 hr in dist. water @ 80°, 1 hr @ 80° C. in 10% $HNO_3$, 1 hr in dist. water @ 80° C. | 60% | 90% |
| 50 | Boiled in 5 M $H_2SO_4$ 30 min | 90% | 90% |
| 50 | Boiled in 5% $H_2O_2$ 30 min | 70% | 90% |
| 50 | Boiled in water 1 hour | 90% | 90% |
| 50 | Boiled in water 45 min | 88% | 85% |
| 50 | Soaked in boiling water for 1 hour then soaked in 5 M $H_2SO_4$ at room temp for 1 hour | 79% | 95% |
| 50 | Boiled 45 min. in 5 M HCl | 82% | 90% |
| 50 | Boiled 45 min. in 5 M NaOH | 90% | 87% |
| 50 | Soaked in 5 M $H_2SO_4$ 24 hours at room temp | No results - high resistance | |
| 50 | Soaked in 1 M $H_2SO_4$ for 1 hour @ 90° C. | 74% | 81% |
| 25 | Boiled in $H_2SO_4$ for 30 min | No results - membrane damaged | |
| 25 | Soaked in 5 M $H_2SO_4$ for 5 hours @ room temp | 60% | 86% |
| | As above, but after 90 charge-discharge cycles | 80% | 79% |
| 25 | Soaked in boiling 5 M $H_2SO_4$ for 20 min | 26% | 84% |
| 25 | Manufacturer's recommended treatment: 1 hour @ 80° C. in 5% $H_2O_2$ then 1 hour in 0.5 M $H_2SO_4$ @ 80° C. | 33% | 85% |
| 25 | Soaked for 24 hour in $H_2SO_4$ at room temp | 80% | 78% |
| 25 | Soaked in 5% $H_2O_2$ @ 80° C. for 1 hour then rinsed in dist water | 65% | 65% |
| 25 | Soaked 10% $HNO_3$ @ 80° C. for 1 hour then rinsed in water | 66% | 75% |
| 25 | Soaked in 0.5 M $H_2SO_4$ @ 80° C. for 1 hour then rinsed in dist water | 72% | 58% |

These results show that treatment with nitric acid as recommended by the manufacturer is detrimental to the performance of these membranes in the Vanadium Redox Cell and should be avoided. Excellent performance was obtained when the thicker membranes were boiled in water, $H_2SO_4$, $H_2O_2$, HCl or NaOH for periods up to 1 hour, however, the thinner 25 micron membrane could not withstand the harsh conditions of boiling for periods more than 30 minutes, so preferred treatment was at temperatures below 80° C. to avoid damage. In the case of the 25 micron membrane, good performance could be obtained by soaking the membrane in the aqueous electrolytes for periods above 12 hours, preferably for periods of 24 hours or more. Room temperature treatments could also be used with the 50 micron membrane, however the treatment time had to be extended to more that 24 hours in the $H_2SO_4$, $H_2O_2$, HCl or NaOH solutions.

Example 4

Figure 7:
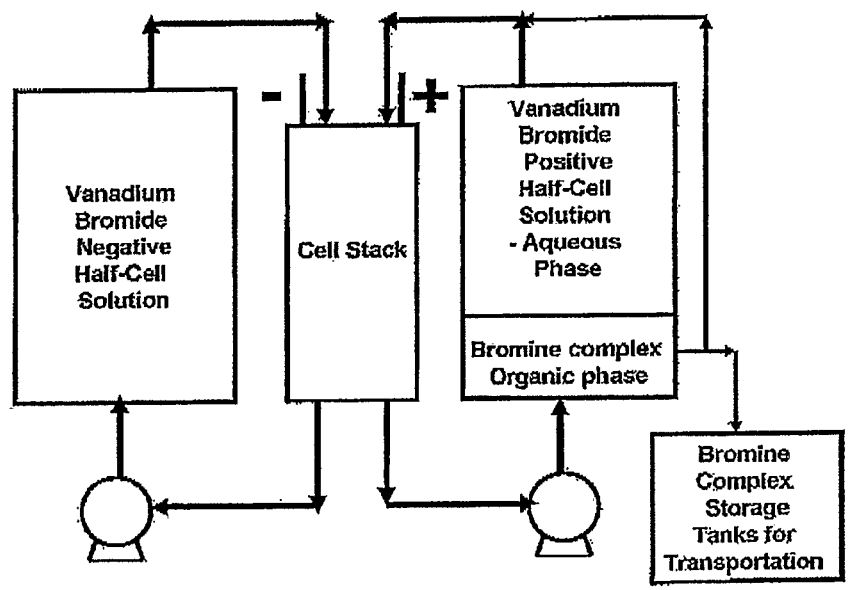
FIG. 7 shows a vanadium bromide redox flow cell employing a complexing agent to bind the bromine and allow gravity separation of the organic phase prior to transportation.

A positive half-cell vanadium bromide electrolyte containing 3 M V in 8 M HBr plus 2 M HCl was prepared by adding 1.5 mole of $V_2O_5$ powder to the HBr/HCl mixture. The V(V) powder reacted by the bromide ions to dissolve as V(IV) bromide while forming bromine in the solution that mainly dissolved as the $Br_3^-$ or $Br_2Cl^-$ species, but partly produced a red bromine vapour above the solution. Different amounts and ratios of N-Ethyl-N-Methylpyrrolidiniumbromide (MEP) and N-Ethyl-N-Methylmorpholiniumbromide (MEM) were added to the solution forming a red oily compound that separated from the aqueous phase of the electrolyte and completely removed the bromine vapour from above the solution mixture. Small volumes of HBr/HCl solution were added to bring the final vanadium electrolyte concentration to 2.0M. Samples of each solution/mixture were stored at different temperatures for several weeks. The mixture that contained 1 M MEP was found to produce an organic phase that was a liquid at 40° C., but solidified at below room temperature. When MEM was added to the positive electrolyte however, the organic phase that was produced tended to remain liquid at lower temperatures. By adjusting the MEM:MEP ratio, it is therefore possible to produced an organic bromine complex phase in the charged positive solution that can be separated for transportation as illustrated in FIG. 7 or solidified by lowering the temperature to allow easy storage, separation or transportation. By increasing the temperature, the organic phase becomes liquid again, thus allowing operation of the redox flow cell.

When the MEM/MEP solution was tested in the Vanadium Redox Battery with the cast perfluorinated membrane, a coulombic efficiency of 86% was obtained.

Example 5

Figure 8:
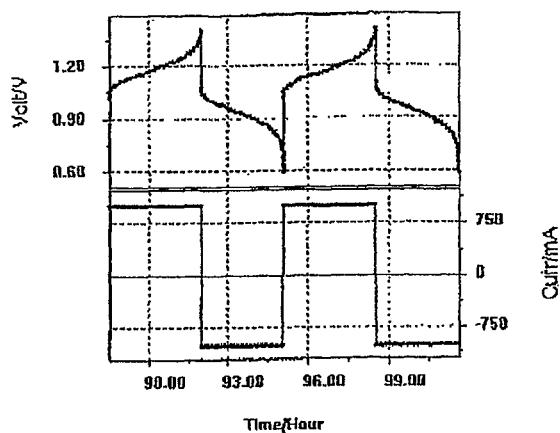
FIG. 8 shows typical charge-discharge curves obtained in a vanadium bromide redox flow cell employing 2 M vanadium ions in a supporting electrolyte of 6 M HBr plus 2 M HCl. The membrane was a piece of 50 micron (20 mil) thick cast perfluorinated membrane and the cell employed graphite felt electrodes of area 25 cm2, approximately 60 mls of 2 M vanadium bromide electrolyte in each half-cell. The cell was charge-discharge cycled at 1000 mA.

A piece of 50 micron (2 mil) perfluorinated membrane was boiled in 5 M sulphuric acid for 30 minutes and placed in a V/Br flow cell with graphite felt electrodes of area 25 cm$^2$ and containing approximately 60 mls 2 M vanadium bromide electrolyte in each half-cell. The cell was charge-discharge cycled at 1000 mA. FIG. 8 shows typical charge-discharge curves. Average efficiencies from these curve are: Voltage Efficiency—78%, Coulombic Efficiency—91%. The slight drop in voltage efficiency of the flow cell compared with the earlier static cell is due to the fact that the flow cell tests were conducted at 1000 mA compared to 500 mA in the static cells and the half-cell cavity was 2.5 mm. Further voltage efficiency improvements should be possible with reduced electrode resistance using more compression in the half-cell cavity. The cell was cycled for several weeks with no drop in capacity or efficiency and negligible solution transfer. After 12 months of charge-discharge cycling, the cell was dismantled and the membrane was found to be in excellent condition with no fouling or blistering observed.

Example 6

A piece of cast perfluorinated membrane with the following properties was tested in the above Vanadium Bromide Redox Cell:

Nominal Thickness: 5 mil
Acid Capacity: 0.97 mmol/g
Conductivity: 0.1 S/cm (25° C.)
Water Uptake: 50% (100° C., 1 h)
Linear Expansion: 1% (23° C., from 50% RH to water soaked)
Tensile Strength: 37 MPa (50% RH, 23° C., Isotropy)
Melting Point: 219° C.

Figure 9:
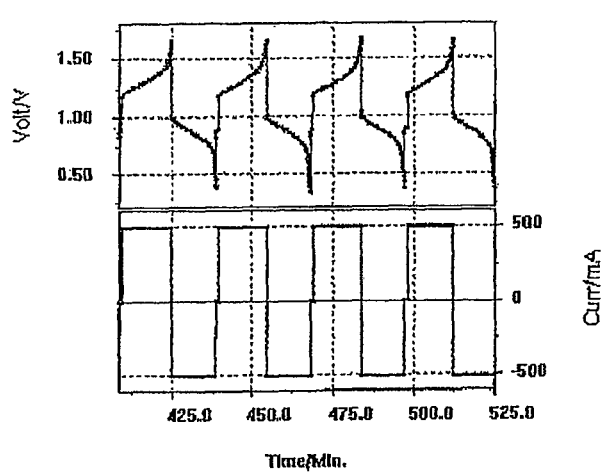
FIG. 9 shows typical charge-discharge curves obtained with a 50 mil thick cast perfluorinated membrane tested in the static Vanadium Bromide Redox Cell at a current of 500 mA.

This is a thick membrane, and therefore produced a very high resistance in the cell. The membrane was therefore soaked in the electrolyte overnight before being retested in the cell. Typical charge-discharge curves for the 5 mil thick cast perfluorinated membrane in a vanadium bromide redox cell at a current of 500 mA are shown in FIG. 9. Results obtained are; Voltage Efficiency—68%, Coulombic Efficiency—90%.

The preferred thickness of the cast membrane for Vanadium Redox Flow Cell applications is therefore less than 5 mil or 125 microns.

Example 7

A 3 M vanadium bromide solution is prepared by slowly mixing 1.5 moles of vanadium trioxide powder with 0.75 moles of bromine liquid in a 1 liter flask containing a 6.5 M HBr/2 M HCl mixture. The bromine oxidises the vanadium trioxide powder allowing it to partially dissolve as V(IV) ions while the bromine is reduced to bromide ions. The remaining unreacted vanadium trioxide dissolves to form V(III) ions. On complete dissolution and reaction, the solution volume is made up to 1 liter by addition of the HBr/HCl stock solution to produce a final solution of composition: 1.5 M V(III) plus 1.5 M V(IV) (ie 3 M V(3.5+)) in 9 M HBr plus approximately 1.9 M HCl. To this solution is added 1 M MEM plus 0.5 M MEP to complex any bromine produced when the solution is charged in a vanadium bromide redox flow cell.

Example 8

A vanadium bromide electrolyte for use in the V/BrRB is prepared by adding 0.5 mole of bromine solution to 1 mole $V_2O_3$ powder in 1 liter volumetric flask that also contains 1 mole of a MEM/MEP mixture. A solution of 8 M HBr and 2 M HCl is then added to make the volume up to 1 liter. The bromine partially oxidises the vanadium trioxide powder, allowing is to dissolve rapidly while forming bromide ions and converting half of the V(III) to V(IV) ions in solution. This gives a final solution of 1 M V(III)+1 M V(IV) (referred to as 2 M V(3.5+)) that can be applied to both half-cells of a V/BrRB. When this electrolyte was fully charged in the V/BrRB, the bromine produced in the positive half-cell, combined with the MEM/MEP complexing agent to produce a red oily layer of the complexed bromine, which on mixing with the aqueous vanadium bromide layer, produced an emulsion. Samples of the positive half-cell emulsion were placed into sample tubes and stored at different temperatures to determine the stability of the bromine complex. The following table summarises the results obtained for different MEM to MEP ratios:

Appearance of red organic complex layer

| Solution Number | MEM conc (M) | MEP conc (M) | V conc (M) | Br$_2$ (M) | After 7 days at 11° C. | After 7 days at room temp | After 7 days at 40° C. |
|---|---|---|---|---|---|---|---|
| 1 | 1.0 | 0 | 2 | 1 | Solid | Solid | Solid |
| 2 | 0.75 | 0.25 | 2 | 1 | Liquid | Liquid | Liquid |
| 3 | 0.5 | 0.5 | 2 | 1 | Liquid | Liquid | Liquid |
| 4 | 0.25 | 0.75 | 2 | 1 | Solid | Solid | Liquid |
| 5 | 0 | 1.0 | 2 | 1 | Solid | Solid | Liquid |

Solution 2 and 3 are thus seen to be potentially suitable electrolyte compositions for the positive half-cell electrolyte, producing a liquid organic phase for the bromine complex that has good stability over the temperature range 11 to 40° C.

An approximately 3 M vanadium bromide electrolyte for use in the V/BrRB is also prepared by adding 0.75 moles of bromine solution to 1.5 moles V$_2$O$_3$ powder in 1 liter volumetric flask that also contains approximately 0.75 moles of a MEM/MEP mixture. A solution of 8 M HBr and 2 M HCl is then added to make the volume up to 1 liter. Again, the bromine partially oxidises the vanadium trioxide powder, allowing is to dissolve rapidly while forming bromide ions and converting half of the V(III) to V(IV) ions in solution. This gives a final solution of approximately 1.5 M V(III)+1.5 M V(IV) (referred to as 3 M V(3.5+)) that can be applied to both half-cells of a V/BrRB. When this electrolyte was fully charged in the V/BrRB, samples of the positive half-cell emulsion were removed and placed into sample tubes and stored at different temperatures to determine the stability of the bromine complex. The following table summarises the results obtained:

| Sample Number | Solution composition | 25° C. for 15 days | 40° C. for 10 day | 11° C. for 10 days |
|---|---|---|---|---|
| 1 | 3 M V(IV) 1.5 M Br$_2$ 0.75 M MEM | Dark green aqueous layer with some brown gas and orange organic liquid layer | N/A | Dark green liquid with orange liquid organic layer |
| 2 | 3 M V(IV) 1.5 M Br$_2$ 0.5 M MEM 0.25 M MEP | Dark green liquid with orange layer | Dark green liquid with some brown gas and orange layer | Dark green liquid with orange layer |
| 3 | 3 M V(IV) 1.5 M Br$_2$ 0.38 M MEM 0.38 M MEP | Dark green liquid with some brown gas and orange liquid organic layer | N/A | Dark green liquid with orange liquid organic layer |
| 4 | 3 M V(IV) 1.5 M Br$_2$ 0.25 M MEM 0.5 M MEP | Dark green liquid with some brown gas and orange liquid organic layer | N/A | Dark green liquid with orange liquid organic layer |
| 5 | 3 M V(IV) 1.5 M Br$_2$ 0.20 M MEM 0.6 M MEP | Dark green liquid with orange liquid organic layer | Dark green liquid with some brown gas and orange layer | Dark green liquid with orange liquid organic layer |
| 6 | 3 M V(IV) 1.5 M Br$_2$ 0.75 M MEP | Dark green liquid with orange layer | Dark green liquid with orange layer | Dark green liquid with orange layer |

These results show that by reducing the Br$_2$/complex ratio, the formation of a solid organic layer is reduced, however, some bromine vapour appears in some solutions at the higher temperatures. In the case of solution 6, however, no bromide gas formation occurs at elevated temperature and no solid bromine complex is produced at the lower temperature.

Example 9

Figure 10:
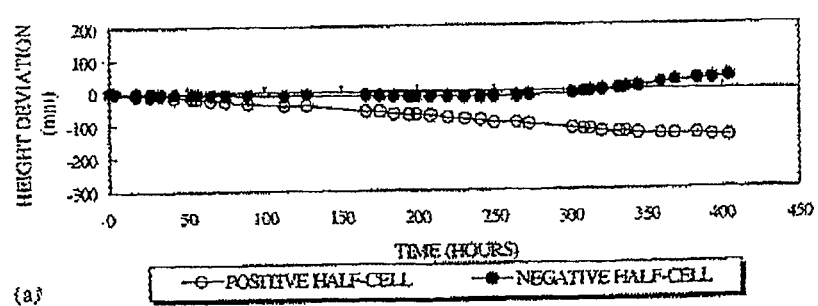
FIG. 10 shows the water transfer behaviour of the Nafion 112 membrane in a V-VRB redox cell arrangement

The water transfer behaviour of the cast perfluorinated membrane of Example 3, was compared to that of Nafion 112 and the results are illustrated in FIG. 10. The test was conducted by placing a 2 M V(III) sulphate solution on one side of the membrane and a 2 M V(IV) sulphate solution on the other side in a circular cell that was constructed from clear Perspex with a 40 ml cavity in each half-cell. The membrane area exposed to the electrolytes was 15.9 cm$^2$. Each half-cell contained a long Perspex tube, 45 cm in length and an internal diameter of 4.2 mm, drilled through the cell into the cavity area. The solutions which corresponded to 0% state of charge V/VRB electrolytes, were at the same initial level about halfway up the tubes. The deviations in electrolyte level were monitored and recorded periodically. Every 72 mm height deviation equated to 1 ml of electrolyte volume difference. The graph shows a 200 mm height differential after about 400 hours testing in the case of the Nafion 112, while negligible height deviation was observed in the case of the cast membrane of the same chemical composition and thickness.

Example 10

A piece of Nafion 112 membrane was tested in a vanadium redox flow cell employing 60 ml of 2 M vanadium in 5 M sulphuric acid solution in each half cell. The cell had an electrode and active membrane area of 25 cm$^2$ and was charge discharge cycled a 1 Amp. During the initial charge step a large volume transfer occurred from the positive half-cell to the negative half-cell. During discharge, some of the electrolyte moved back into the positive half-cell through the membrane, but a continuous net solution flow continued to occur into the negative half-cell until the solution level in the positive half-cell reservoir was too low and air began to be sucked into the tubes. To allow the cell to continue operating, 10 ml of solution had to be transferred from the negative back into the positive reservoir every 10 or so cycles, making cell operation very difficult. During continuous cycling the voltage efficiency was observed to decrease from an initial value of approximately 80% to less than 70%. After a few weeks of cycling, the cell was dismantled and a brown discoloration was observed on the membrane, showing that it had fouled.

Example 11

Figure 11:
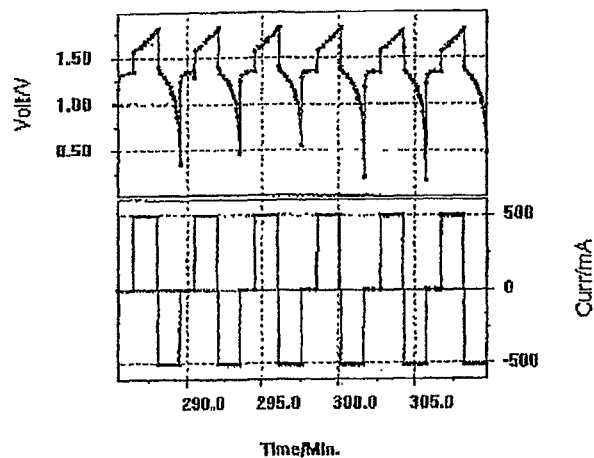
FIG. 11 shows typical charge and discharge curves for a static cell employing the cast perfluorinated membrane and a 2 M vanadium solution in 5 M $H_2SO_4$ supporting electrolyte as the electrolyte for both positive and negative half-cells. The membrane was boiled in distilled water for 45 minutes prior to use.

FIG. 11 shows typical charge and discharge curves for a static cell employing the 50 micron cast perfluorinated membrane of Example 3 and a 2 M vanadium solution in 5 M $H_2SO_4$ supporting electrolyte as the electrolyte for both positive and negative half-cells. The membrane was boiled in distilled water for 45 minutes prior to use. The cell employed a 3 mm thick graphite felt electrode in a 2.5 mm half-cell cavity. Charging and discharge current=0.5 Amp, electrode area=25 $cm^2$. The cycles shown are cycles 65 to 70. From these graphs, 72% voltage efficiency and 94% coulombic efficiency were calculated, giving an overall energy efficiency of 68%. The performance of the cell remained constant for more than 80 charge-discharge cycles and no fouling was observed when the membrane was removed from the cell.

Example 12

Figure 12:
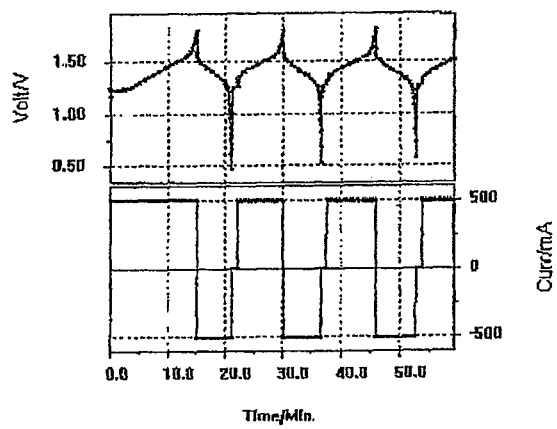
FIG. 12 represents typical charge-discharge curves for the cycling of the static vanadium sulphate redox cell that employed a cell cavity of 2 mm thickness and a cast perfluorinated membrane that was treated by boiling in 10% hydrogen peroxide for 1 hour.

FIG. 12 represents typical charge-discharge curves for the cycling of the same static vanadium sulphate redox cell as in Example 11, except that this cell employed a cell cavity of 2 mm thickness and the 50 micron cast perfluorinated membrane was treated by boiling in 10% hydrogen peroxide for 1 hour. The calculated voltage efficiency=93% and coulombic efficiency=86%. The overall energy efficiency of this static cell was approximately 80%. The capacity and performance of this cell remained constant for more than 80 charge-discharge cycles and no fouling was observed when the membrane was removed from the cell.

Example 13

Figure 13:
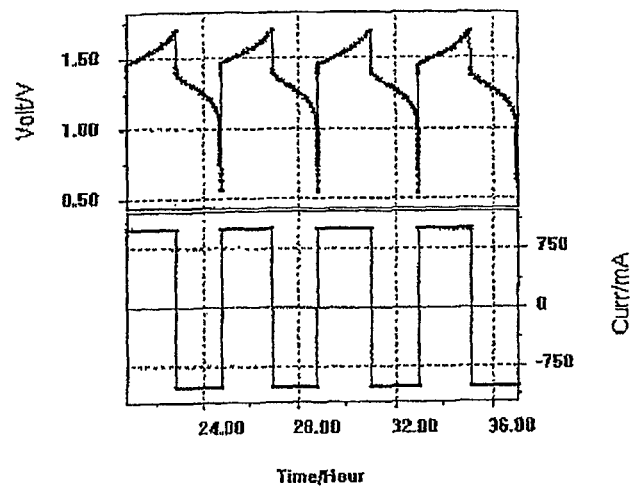
FIG. 13 shows typical charge-discharge curves for a vanadium sulphate redox flow cell containing approximately 60 ml in each half-cell of 1.6 M vanadium solution in $H_2SO_4$. The membrane was a 50 micron thick cast perfluorinated membrane treated in 5 M $H_2SO_4$ for 30 minutes prior to use.

FIG. 13 shows typical charge-discharge curves for a vanadium sulphate redox flow cell containing approximately 60 ml in each half-cell of 1.6 M vanadium solution in $H_2SO_4$. The felt comprised a glassy carbon current collector onto which was contacted a 3 mm thick graphite felt of electrode area=25 $cm^2$. The graphite felt was contained in a 2.5 mm flow-frame and the charging and discharging current=1 Amp. Cycles shown are cycle numbers 6 to 10 and the membrane was a 50 micron thick cast perfluorinated membrane of Example 3 that had been treated in 5 M sulphuric acid at 80° C. for 30 minutes prior to use. At twice the charge and discharge current as that for Example 13, the voltage and coulombic efficiencies of this cell were 81% and 90% respectively, giving an overall energy efficiency of 73%. By optimising the glassy carbon/graphite felt electrical contact by using higher compression in the cell cavity, a lower cell resistance would be expected, with an accompanying higher energy efficiency. The capacity and performance of this cell remained constant for more than 800 cycles with no significant electrolyte transfer observed from one half-cell to the other during the testing. No fouling was observed when the membrane was removed from the cell after more than 10 months of cycling.

Example 14

Figure 14:
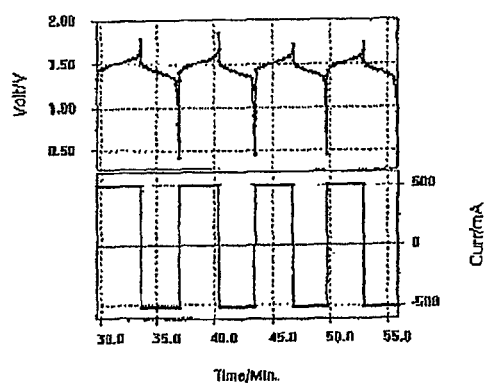
FIG. 14 shows typical charge-discharge curves obtained in a static cell containing 1.6 M vanadium in sulphuric acid and a 25 micron thick piece of perfluorinated membrane that was soaked in boiling $H_2SO_4$ (removed from hotplate) for 30 minutes prior to use.

A 25 micron thick piece of cast perfluorinated membrane was soaked in boiling $H_2SO_4$ (removed from hotplate) for 30 minutes. Typical charge-discharge curves obtained in a static cell containing 1.6 M vanadium in sulphuric acid are shown in FIG. 14. The average efficiencies obtained were Eff(Volt)=92.7%, Eff(coul)=87.2% and Eff(energy)=80.8%. In a separate experiment, a different sample of the same was soaked in 5 M $H_2SO_4$ for 5 hours at room temperature, and the coulombic and voltage efficiencies were 80% and 60% respectively.

Example 15

A polysulphone membrane was employed in the all-vanadium redox cell of Example 14. The cell was cycled at 1 Amp for several weeks and the initial energy efficiency was 80%. During cycling, however, the capacity was found to decrease and a steady movement of electrolyte from the positive to the negative half-cell reservoir was observed. To restore the capacity, solution had to be manually transferred from the negative to positive half-cell every 20 to 30 cycles, making operation difficult. After 2 weeks of cycling, a drop in voltage efficiency occurred. When the cell was dismantled a brown discoloration was observed on the membrane showing that fouling had occurred.

Example 16

Figure 15:
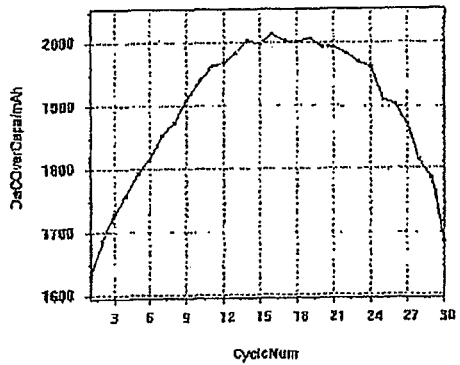
FIG. 15 is a plot of capacity versus cycle number for a V-VRB redox flow cell to which 1 ml of ethanol was added to the positive half-cell electrolyte to rebalance the positive and negative half-cell electrolyte oxidation states and restore capacity.

A V-VRB redox flow cell was cycled for several months and the capacity was seen to gradually decrease due to the air oxidation of the V(II) ions in the negative half-cell. One ml of ethanol was added to the positive half-cell electrolyte and the cell continued to cycle. FIG. 15 shows a graph of capacity versus cycle number after the addition of the ethanol. A gradual increase in the capacity is observed as the ethanol slowly reduces some of the V(V) ions to V(IV) in the positive half-cell electrolyte so as to equalize the molar ratio of V(V) to V(II) in the positive and negative half-cell solutions respectively and balance the state of charge of the positive half-cell relative to that of the negative half-cell. After approximately 20 charge-discharge cycles, however, the capacity of the cell started to decrease again as the ethanol had been consumed and air oxidation of the V(II) ions in the negative half-cell electrolyte began to dominate once again. The same effect was obtained with the V/BrRB and in the case of both the V-VRB and V/BrRB, the effect is independent of the type of membrane employed.

Example 17

In one example, a V/BrRB is employed in a transportable energy system that transports energy from a remote wave platform, wind farm or solar array to the nearest grid, avoiding the need to install additional grid lines or submarine cables in the case of off-shore locations. The V/BrRB is typically installed in one or more large cargo ships with the electrolyte tanks located in the hull of the ship and the battery stacks on the deck. The power output from the wave generator, wind generators or solar arrays is used to charge the V/BrRB electrolytes and when fully charged, the ship transports the charged solutions to the nearest grid point for distribution into the electricity network. While one ship is transporting the energy and discharging it into the grid, a second ship with a similar V/BrRB systems connects to the solar array or to the wind or wave generator and absorbs the generated power until it is fully charged. The higher energy density offered by the V/BrRB makes this application more feasible since the transportation costs per kWh of energy is considerably reduced compared with the All Vanadium Redox Battery.

Example 18

The Vanadium Redox Batteries of this invention are employed as energy storage systems integrated into an energy system incorporating a photovoltaic array, wind turbines, diesel generators, electricity grid or other power generation equipment. The batteries are integrated with a battery controller that monitors battery condition and determines optimum operation. Typical modes of operation and integration of the Vanadium Batteries of this invention are as described by K. Sato, S. Miyake and M. Skyllas-Kazacos in Features, Advantages and Applications of the Vanadium Redox Battery, 16th International Forum on Applied Electrochemistry, Amelia Island Plantation, Fla., USA, 11 Nov. 2002 and by D. J. Hennessy in US2005158614, Publication date: 2005-07-21, US2005156432, 2005-07-21 and US2005156431, 2005-07-21.

Example 19

Figure 16A:
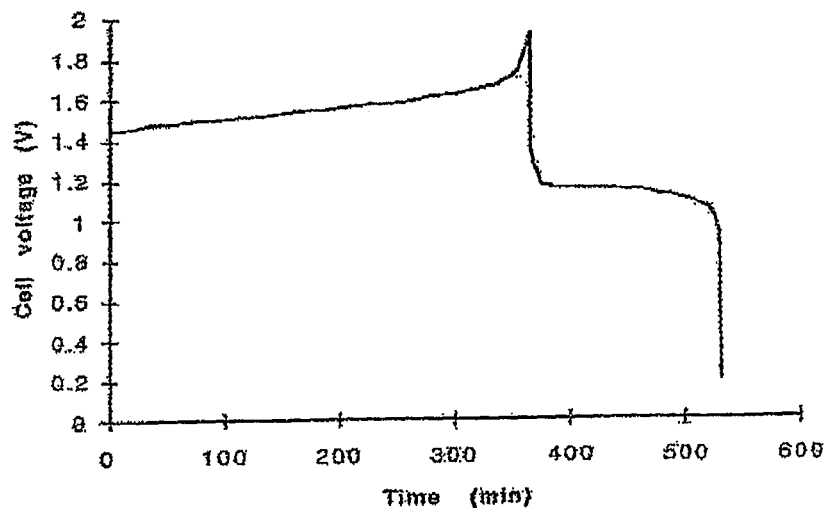
FIG. 16(a) shows discharge with hydrogen peroxide added to the positive half cell and FIG. 16(b) shows discharge without hydrogen peroxide.
Figure 16B:
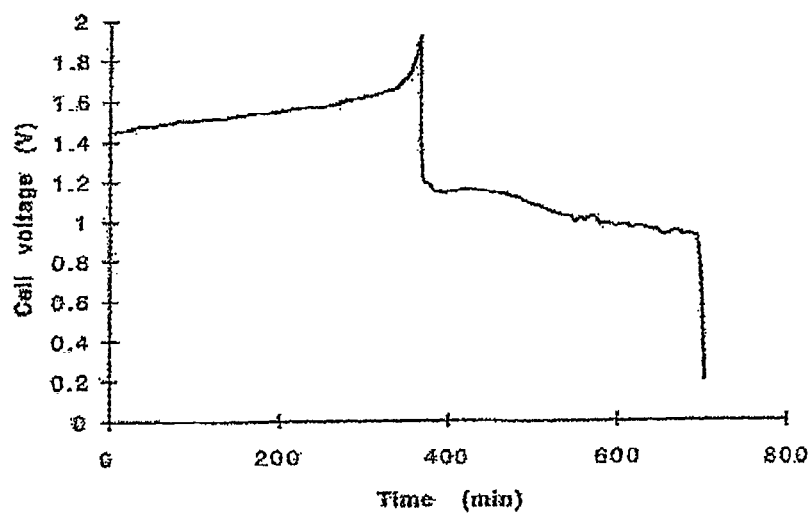

Chemical regeneration of V(V) in the case of the V-VRB and of $Br_3^-$ in the case of the V/BrRb is a means by which a small volume of the positive half-cell electrolyte can employed in combination with a larger volume of negative half-cell electrolyte so as to reduce the weight and volume of the vanadium redox flow cell for a particular cell capacity. Experiments were conducted with a cell employing 140 ml of a 2 M V(III) solution in 5 M $H_2SO_4$ was added to the negative half-cell of a vanadium redox flow cell and 70 ml of the same solution was added to the positive half-cell. The cell had an electrode and membrane area of 25 $cm^2$ and was first charged at a current density of 20 mA/$cm^2$ to produce V(II) and V(V) ions in the negative and positive half-cell electrolytes respectively. The cell was then discharged at the same current density to a discharge voltage limit of 0.2 V. The discharge time for the cell is limited by the volume of the positive half-cell electrolyte and as seen from FIG. 16(a) the discharge time is half the charge time. In a separate experiment, an identical cell was charged and discharged under the same conditions, but in this case, a 30% hydrogen peroxide solution was added dropwise to the positive half-cell electrolyte during discharge using a syringe. As seen in FIG. 16(b), the discharge time is twice that obtained without the hydrogen peroxide addition and is due to the fact that as the V(V) ions are reduced to V(IV) in the positive half-cell during discharge, hydrogen peroxide is continually re-oxidising the V(IV) to V(V) so that the discharge capacity becomes limited by the volume of the negative half-cell electrolyte. The theoretical volume of 30% hydrogen peroxide needed to re-oxidise 70 ml of V(IV) to V(V) is 7.2 ml, so for a total positive electrolyte volume of 77.2 ml, it should be possible to obtain the same discharge capacity as for a cell containing 140 ml of positive electrolyte. This allows a significant reduction in the total electrolyte weight and volume per kWh.

A similar result was obtained in the case of a vanadium redox cell employing a vanadium bromide electrolyte, the addition of peroxide successfully regenerating the $Br_3^-$ ions in the positive electrolyte to allow the same cell capacity to be achieved with half or even lower volume of the positive half-cell electrolyte.

Although the foregoing description has shown, described and pointed out novel features of the invention, it will be understood that various omissions, substitutions and changes in the form of the detail of the apparatus as illustrated as well as the uses thereof, may be made by those skilled in the art without departing from the spirit of the present invention. Consequently, the scope of the present invention should not be limited by the foregoing discussion but should be defined by the appended claims.

The invention claimed is:

1. A redox cell comprising:
a positive half-cell in communication with a positive half cell solution that contains at least one vanadium ion selected from the group consisting of vanadium (III), vanadium (IV) and vanadium (V);
a negative half-cell in communication with a negative half cell solution that contains at least one vanadium ion selected from the group consisting of vanadium (II), vanadium (III) and vanadium (IV); and
a cast perfluorinated ionically conducting membrane located between the positive half cell and the negative half cell and in contact with the positive half cell solution and the negative half cell solution and wherein the perfluorinated membrane comprises a polymer selected from the group consisting of a PTFE, perfluorosulfonic acid and a perfluorosulphonic acid/PTFE copolymer, said membrane having isotropic swelling and tensile strength properties, a conductivity at 25° C. of between 0.01 and 1 S/cm, and having a linear expansion of less than 8% in both directions from 50% Relative Humidity at 23° C. to water soaked at 23° C.

2. The redox cell according to claim 1, wherein the perfluorinated ionically conducting membrane comprises a polymer selected from the group consisting of a PTFE, perfluorosulfonic acid and perfluorosulphonic acid/PTFE copolymer in acid form.

3. The redox cell according to claim 1, wherein the perfluorinated ionically conducting membrane has a thickness of between 0.5 and 5 mil, an acid capacity of between 0.5 and 2 mmol/g, a conductivity at 25° C. of between 0.01 and 1 S/cm, a water uptake of between 30% and 70% at 100° C. for 1 hour, a tensile strength of between 20 and 60 MPa and a melting point ranging from 180 to 240° C.

4. The redox cell of according to claim 1, wherein the membrane comprises microparticles which increase water uptake and conductivity and which decrease linear expansion of the membrane.

5. A process for making a redox cell comprising a positive half-cell in communication with a positive half cell solution that contains at least one vanadium ion selected from the group consisting of vanadium (III), vanadium (IV) and vanadium (V); a negative half-cell in communication with a negative half cell solution that contains at least one vanadium ion selected from the group consisting of vanadium (II), vanadium (III) and vanadium (IV); and a cast perfluorinated ionically conducting membrane located between the positive half cell and the negative half cell and in contact with the positive half cell solution and the negative half cell solution and wherein the perfluorinated membrane comprises a polymer selected from the group consisting of a PTFE, perfluorosulfonic acid and a perfluorosulphonic acid/PTFE copolymer, said membrane having isotropic swelling and tensile strength properties, a conductivity at 25° C. of between 0.01 and 1 S/cm, and having a linear expansion selected from the group consisting of less than 8%, less than 5% and less than 3% in both directions from 50% Relative Humidity at 23° C. to water soaked at 23° C.,
said process comprising:
treating a cast perfluorinated ionically conducting membrane prior to use in the redox cell by soaking the membrane in an aqueous solution to reduce resistivity of the membrane and enhance voltage efficiency during the charge-discharge cycling of the redox celltreating the membrane prior to use in the redox cell by soaking the membrane in an aqueous solution to reduce resistivity of the membrane and enhance voltage efficiency during the charge-discharge cycling of the redox cell;
locating the membrane between and in contact with a positive half cell and a negative half cell, and introducing a positive half cell solution into the positive half cell and a negative half cell solution into the negative half cell, wherein:

the positive half cell solution contains at least one vanadium ion selected from the group consisting of vanadium (III), vanadium (IV) and vanadium (V);

the negative half cell solution contains at least one vanadium ion selected from the group consisting of vanadium (II), vanadium (III) and vanadium (IV); and the perfluorinated ionically conducting membrane comprises a polymer selected from the group consisting of a PTFE, perfluorosulfonic acid and a perfluorosulphonic acid/PTFE copolymer.

6. The process of claim 5, wherein treating the membrane is carried out at above room temperature.

7. The process of claim 6, wherein treating the membrane is conducted in a process having at least one step and in at least one aqueous solution.

8. The process of claim 7, wherein the aqueous solution is selected from the group consisting of hydrogen peroxide, HCl, NaOH and sulphuric acid.

9. The process of claim 5 further comprising boiling the membrane in water prior to use in the redox cell in order to reduce resistivity of the membrane and enhance voltage efficiency during the charge-discharge cycling of the redox cell.

10. The redox cell according to claim 1, wherein the positive half-cell solution includes a first supporting electrolyte selected from the group $H_2SO_4$, HBr and HBr/HCl mixtures, and the negative half-cell solution includes a second supporting electrolyte selected from $H_2SO_4$, HBr and HBr/HCl mixtures.

11. The redox cell according to claim 1, wherein the vanadium (III) ions and the vanadium (IV) ions in both the positive half cell solution and the negative half cell solution are in a V(III):V(IV) molar ratio of substantially 1:1 and wherein a ratio of volume of the negative half cell solution to a volume of the positive half cell solution is substantially 1:1.

12. The redox cell according to claim 10, wherein:
the positive half cell solution includes at least one ion selected from the group V(V) ions, $Br_3^-$ ions and $Br_2Cl^-$ ions;
the negative half cell solution includes at least one ion selected from the group vanadium (II) ions and vanadium (III).

13. The redox cell according to claim 10, wherein the first supporting electrolyte and the second supporting electrolyte are independently selected from the group consisting of $H_2SO_4$, HBr and HBr/HCl mixtures and wherein vanadium ion concentration in both the first supporting electrolyte and the second supporting electrolyte is between 1 and 3M.

14. The redox cell according to claim 13, wherein the vanadium ion concentration is between 2 and 3M.

15. The redox cell according to claim 13, wherein total supporting electrolyte concentration in both the first supporting electrolyte and the second supporting electrolyte is between 2 and 10M.

16. The redox cell according to claim 13, wherein the first supporting electrolyte and the second supporting electrolyte are each $H_2SO_4$ and the total sulphate concentration is 4-5M and wherein the vanadium concentration is 1-2M in both the first supporting electrolyte and the second supporting electrolyte.

17. The redox cell according to claim 13, wherein the first supporting electrolyte and the second supporting electrolyte are each HBr at a concentration between 4 and 9M.

18. The redox cell according to claim 13, wherein the first supporting electrolyte and the second supporting electrolyte each contain HCl at a concentration of 0.1 to 3M.

19. The redox cell according to claim 17, wherein the first supporting electrolyte and the second supporting electrolyte each contain HCl at a concentration of 0.1 to 3M and a complexing agent to bind bromine.

20. The redox cell according to claim 19, wherein the complexing agent is selected from at least one of a group consisting of N-ethyl-N-methylpyrrolidiniumbromide (MEP), N-ethyl-N-methylmorpholiniumbromide (MEM).

21. A method for using the redox cell of claim 13 in refueling an electric vehicle, said method comprising the steps of:
draining discharged positive half cell solution and discharged negative half cell solution from the positive and negative half cells respectively of a first redox cell according to claim 1 into external storage tanks, said redox cell being mounted on the vehicle;
pumping said solutions through a second, external charging, redox cell according to claim 1, said second redox cell being powered by a power source selected from the group consisting of grid power, diesel generated power, wind generated power, wave generated power, solar energy from photovoltaic arrays;
recharging the positive and negative half cell solutions; and
re-using said positive and negative half cell solutions in the first redox cell.

22. The redox cell of claim 1, wherein the positive half-cell is rebalanced with the negative half-cell so as to restore capacity loss due to gassing reactions and air oxidation of the negative half-cell during charge-discharge cycling, wherein the positive half-cell comprises a pre-determined quantity of an oxidizable organic compound periodically added to partially reduce the V(V) or polyhalide ions and restore capacity.

23. The redox cell of claim 22, wherein the oxidizable organic compound is such that the product of an oxidation reaction is carbon dioxide and water.

24. The redox cell according to claim 23, wherein the oxidizable organic compound is selected from the group consisting of ethanol and methanol.

25. A method for chemically regenerating the redox cell of claim 1, comprising adding hydrogen peroxide to the positive half-cell.

* * * * *